(12) United States Patent
Puleri et al.

(10) Patent No.: US 10,520,759 B2
(45) Date of Patent: Dec. 31, 2019

(54) OPTO-ELECTRONIC OSCILLATOR AND METHOD OF GENERATING AN ELECTRICAL CARRIER SIGNAL

(71) Applicant: Telefonaktiebolaget LM Ericsson (publ), Stockholm (SE)

(72) Inventors: Marzio Puleri, Pisa (IT); Antonella Bogoni, Pisa (IT); Claudio Porzi, Pisa (IT); Antonio D'Errico, Pisa (IT); Paolo Ghelfi, Pisa (IT); Giovanni Serafino, Pisa (IT); Vito Sorianello, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/067,494

(22) PCT Filed: Jan. 7, 2016

(86) PCT No.: PCT/EP2016/050183
§ 371 (c)(1),
(2) Date: Jun. 29, 2018

(87) PCT Pub. No.: WO2017/118482
PCT Pub. Date: Jul. 13, 2017

(65) Prior Publication Data
US 2019/0004341 A1    Jan. 3, 2019

(51) Int. Cl.
*H01S 3/10* (2006.01)
*G02F 1/01* (2006.01)
*H04B 1/04* (2006.01)

(52) U.S. Cl.
CPC ........ *G02F 1/0121* (2013.01); *G02F 2203/50* (2013.01); *H04B 1/04* (2013.01); *H04B 2210/006* (2013.01)

(58) Field of Classification Search
CPC .. G02F 2203/50; H04B 1/04; H04B 2210/006
(Continued)

(56) References Cited

U.S. PATENT DOCUMENTS 6,580,532 B1 *  6/2003  Yao ........................... H03L 7/04
                                                              372/29.011
6,928,091 B1    8/2005  Maleki et al.
(Continued)

FOREIGN PATENT DOCUMENTS

JP    2007 079096 A    3/2007

OTHER PUBLICATIONS

Optoelectronic Oscillator for Photonic Systems by X. Steve Yao and Lute Maleki; IEEE Journal of Quantum Electronics, vol. 32, No. 7—Jul. 1996.
(Continued)

*Primary Examiner* — Sonny Trinh
(74) *Attorney, Agent, or Firm* — Sage Patent Group

(57) ABSTRACT

An opto-electronic oscillator (10) comprising: an optical source (12) to generate an optical carrier signal having a carrier wavelength; an optical phase modulator (14) to apply a sinusoidal phase modulation to the optical carrier signal to generate two first order sidebands having a π phase difference between them; an optical phase shifter (16) comprising an optical resonator configured to apply a substantially π phase-shift to one of the first order sidebands at a preselected wavelength within an optical spectrum of said first order sideband; and a photodetector (18) configured to perform optical heterodyne detection of the optical carrier signal with both: said one of the first order sidebands substantially it phase shifted by the optical resonator; and the other of the first order sidebands, to generate an electrical carrier signal (20), and wherein a first part of the electrical carrier signal (20a) is delivered to an electrical output (22) and a second
(Continued)

part of the electrical carrier signal (20b) is delivered to the optical phase modulator as a drive signal.

17 Claims, 14 Drawing Sheets

(58) Field of Classification Search
USPC .................................................. 372/20, 26
See application file for complete search history.

(56) References Cited

U.S. PATENT DOCUMENTS

| | | | | |
|---|---|---|---|---|
| 7,061,335 B2* | 6/2006 | Maleki | ............... | G06E 3/005 |
| | | | | 331/172 |
| 7,260,279 B2* | 8/2007 | Gunn | ............... | H01S 5/142 |
| | | | | 372/18 |
| 8,538,270 B2* | 9/2013 | Seidel | ............... | G02F 2/002 |
| | | | | 372/21 |
| 9,094,133 B2* | 7/2015 | Poddar | ............... | H04B 10/61 |
| 9,614,280 B2* | 4/2017 | Shi | ............... | H01Q 3/2682 |
| 2007/0206957 A1 | 9/2007 | Shoji et al. | | |
| 2012/0294616 A1* | 11/2012 | Sasaki | ............... | H04J 14/0298 |
| | | | | 398/79 |
| 2013/0259072 A1 | 10/2013 | Maleki et al. | | |

OTHER PUBLICATIONS

A Wideband Frequency Tunable Optoelectronic Oscillator Incorporating a Tunable Microwave Photonic Filter Based on Phase-Modulation to Intensity-Modulation Conversion Using a Phase-Shifted Fiber Bragg Grating by Wangzhe Li and Jianping Yao; IEEE Transactions on Microwave Theory and Techniques, vol. 60, No. 6—Jun. 2012.

RF Photonic Signal Processing Components: From High Order Tunable Filters to High Stability Tunable Oscilators by Anatoliy A. Savchenkov et al.—IEEE 2009.

International Search Report for International application No. PCT/EP2016/050183—dated Sep. 1, 2016.

Wideband Tunable Optoelectronic Oscillator Based on a Phase Modulator and a Tunable Optical FIlter by Xiaopeng Xie et al.; Optics Letters. vol. 38, No. 5—Mar. 1, 2013.

* cited by examiner

OPTO-ELECTRONIC OSCILLATOR AND METHOD OF GENERATING AN ELECTRICAL CARRIER SIGNAL

PRIORITY

This nonprovisional application is a U.S. National Stage Filing under 35 U.S.C. § 371 of International Patent Application Serial No, PCT/EP2016/050183 filed Jan. 7, 2016 and entitled "Opto-Electronic Oscillator and Method of Generating an Electrical Carrier Signal" which is hereby incorporated by reference in its entirety.

TECHNICAL FIELD

The invention relates to an opto-electronic oscillator and to a wireless communications transmitter and a beamforming antenna incorporating the opto-electronic oscillator. The invention also relates to an optical bandpass filter. The invention further relates to a method of generating an electrical carrier signal and to a method of transmitting a wireless communications signal and a method of beamforming incorporating the method of generating an electrical carrier signal.

BACKGROUND

In the past few years, simple architectures for the photonic generation of radio-frequency, RF, signals have been envisioned based on the heterodyning of two independent lasers, but these implementations do not allow for stable RF generation, meaning that the resulting signal is not useful for the requirements of future systems. In order to improve RF signal stability, phase locking of the heterodyned lasers is necessary, and this usually requires more complex and cumbersome set-ups. A relatively simple technique for generating phase locked laser lines is the mode locking of lasers; the intrinsic phase-locking condition of the mode-locked laser, MLL, ensures that the generated RF signal has extremely low phase noise. Moreover, the possibility of selecting laser modes with variable wavelength detuning allows the flexible production of RF carrier signals with tuneable frequency, potentially generating at any multiple frequency of the MLL repetition rate. Moreover, the phase noise of the resulting RF carrier signals has been demonstrated to be significantly less noisy than RF signals generated using state-of-the-art RF synthesizers.

A recent approach for generating stable RF clock signals is the use of an opto-electronic oscillator. OEO. An OEO relies on modulating the light from a laser and feeding back the generated RF signal to the input port of the modulator itself. OEOs have been shown to have extremely low phase noise, thanks to the ultra-low losses of the optical fibres from which they are constructed. An OEO therefore acts as a resonator with an extremely high finesse, i.e., with the capability of storing large energies for a long time.

The first examples of OEOs made use of long fibre delay lines and RF filters in the feedback to fix the oscillation frequency. This approach has the drawback of not allowing frequency tuning of the generated RF signal. Another OEO implementation substitutes the fibre delay line and the RF filter with an optical resonator, enabling wide RF frequency tuning to be achieved. However, in this implementation some of the optical power after the modulator is lost in the filtering operation, which selects a single sideband from the two original sidebands. Therefore, the loss of the feedback loop is increased, and this induces higher phase noise in the oscillator signal.

More recently, OEOs based on phase modulation and phase-to-amplitude modulation conversion have been proposed. The use of a phase modulator instead of an amplitude modulator reduces the insertion losses of the OEO. Moreover, phase modulators do not require a bias voltage for setting their working point, simplifying the operation. In one OEO implementation the phase-modulation to amplitude-modulation conversion is realized by filtering out one of the first-order sidebands generated by the phase modulation. In this way, the phase modulation is transformed into a single sideband amplitude modulation, which can be detected by the photodiode to close the opto-electronic feedback loop. However, even in this case the filtering operation cancels part of the optical power, worsening the phase noise of the oscillation signal.

W. Li, J. Yao, "A wideband frequency tunable optoelectronic oscillator incorporating a tunable microwave photonic filter based on phase-modulation to intensity-modulation conversion using a phase-shifted fiber Bragg grating", IEEE Transactions on Microwave Theory and Techniques vol. 60, no. 6, 2012, reports the conversion from phase-modulation to amplitude-modulation using a phase-shifted fibre Bragg grating, PS-FBG, in reflection. A fibre Bragg grating, FBG, is a distributed Bragg reflector formed within a short section of optical fibre that reflects wavelengths of light that meet the Bragg condition and transmits all other wavelengths. A PS-FBG is an FBG which has a phase-shift generally at the centre of the structure, which results in a transmission band within the reflection spectrum of the FBG. In the OEO reported by Li and Yao an PS-FBG is used in reflection and is configured so that one of the side bands generated by the phase modulation falls within the transmission notch of the PS-FBG and thus has a $\pi$ phase-shift applied to it. In this way the optical power of the affected side band is not cancelled, so the phase modulation is transformed into a double sideband amplitude modulation. Since the resonance frequency of the PS-FBG is not tuneable, in order to change the oscillation frequency of the OEO a tuneable laser is required, which implies a higher cost. Also, the phase shift of the PS-FBG is associated with a notch in the amplitude response, which while not cancelling the affected side band does reduce its optical power, therefore worsening the phase noise of the generated RF signal.

SUMMARY

It is an object to provide an improved opto-electronic oscillator. It is a further object to provide an improved optical bandpass filter. It is a further object to provide an improved wireless communications transmitter. It is a further object to provide an improved wireless communications transceiver. It is a further object to provide an improved beamforming antenna. It is a further object to provide an improved method of generating an electrical carrier signal. It is a further object to provide an improved method of transmitting a wireless communications signal. It is a further object to provide an improved method of receiving a wireless communications signal. It is a further object to provide an improved method of beamforming.

An aspect of the invention provides an opto-electronic oscillator comprising an optical source, an optical phase modulator, an optical phase shifter and a photodetector. The optical source is configured to generate an optical carrier signal having a carrier wavelength. The optical phase modulator is configured to apply a sinusoidal phase modulation to the optical carrier signal to thereby generate two first order sidebands, located on either side of the optical carrier signal respectively. The two first order sidebands have a π phase difference between them. The optical phase shifter comprises an optical resonator configured to apply a substantially π phase-shift at a preselected wavelength within an optical spectrum of one of the first order sidebands. The photodetector is configured to perform optical heterodyne detection of the optical carrier signal with both said one of the first order sidebands substantially π phase shifted by the optical resonator and the other of the first order sidebands. This generates an electrical carrier signal having a frequency equal to a frequency difference between the carrier wavelength of the optical carrier signal and the preselected wavelength at which the optical resonator is configured to apply the substantially π phase-shift. A first part of the electrical carrier signal is delivered to an electrical output of the opto-electronic oscillator. A second part of the electrical carrier signal is delivered to the optical phase modulator as a drive signal for the optical phase modulator.

The phase modulation performed by this OEO may have a reduced insertion loss with respect to the amplitude modulation performed by the prior art OEOs, and the optical phase shifter does not rely on the suppression of optical power from one of the modulation sidebands but rather on the π phase shift of a portion of the optical spectrum of one of the modulation sidebands. This may improve the efficiency of the OEO, reducing losses of optical power. The opto-electronic modulator OEO, may therefore improve the exploitation of the optical power, and reduce the phase noise of the generated electronic carrier signal, as compared to prior art OEOs. Moreover, a phase modulation may be more robust than an amplitude modulation, since it does not require the control of any modulation bias.

In an embodiment, the optical resonator is configured such that the preselected wavelength at which the phase-shift is applied is tuneable within the optical spectrum of said one of the first order side bands. The frequency of the electrical carrier signal may therefore be tuned.

In an embodiment, the opto-electronic oscillator further comprises apparatus configured to tune the preselected wavelength of the optical resonator within the optical spectrum of said one of the first order side bands. The frequency of the electrical carrier signal may therefore be tuned.

In an embodiment, the optical resonator is an optical ring resonator. Both the phase modulation and the phase shift are therefore characterized by low losses, which may optimize the performance of the OEO in terms of phase noise. Use of an optical ring resonator may enable the OEO to be widely tuneable in terms of the generated electrical carrier signal frequency without requiring use of a tuneable laser. The OEO may therefore be more cost effective than the prior art OEO of Li and Yao.

In an embodiment, the optical ring resonator is configured to have a resonant wavelength that is tuneable within the optical spectrum of said one of the first order side bands. The preselected wavelength at which the optical ring resonator applies the substantially π phase shift is therefore tuneable within the range of wavelengths falling within the optical spectrum of the said one of the first order side bands. The frequency of the electrical carrier signal may therefore be tuned.

In an embodiment, the opto-electronic oscillator further comprises apparatus configured to tune the resonant wavelength of the optical ring resonator within the optical spectrum of said one of the first order side bands. The preselected wavelength at which the optical ring resonator applies the substantially a phase shift is therefore tuneable within the range of wavelengths falling within the optical spectrum of the said one of the first order side bands. The frequency of the electrical carrier signal may therefore be tuned.

In an embodiment, the optical ring resonator is configured as an all-pass filter. This may give the optical ring resonator a flat amplitude response, so it does not supress optical power. Configuring the optical ring resonator as an all-pass filter may cause a precisely π phase-shift to be applied at the preselected wavelength within the optical spectrum of the said one of the first order sidebands, so the preselected wavelength is precisely transformed from phase-modulation to amplitude-modulation sustaining the oscillation.

In an embodiment, the optical ring resonator is configured as an add-drop filter comprising an input port, a drop port and a throughput port. The input port is configured to receive the optical carrier signal and the two first order sidebands from the phase modulator. The drop port is configured to output said one of the first order sidebands following application of the substantially π phase-shift. The throughput port is configured to output the optical carrier signal wavelengths other than the preselected wavelength within the optical spectrum of said one of the first order sidebands and the other first order sideband. The phase shifter comprises a first optical path from the throughput port to the photodetector and a second optical path coupling the drop port to the first optical path. Configuring the optical ring resonator as an add-drop filter may result in very low in-band attenuation, for example less than 1 dB.

In an embodiment, the optical phase shifter comprises a phase-controller within the second optical path. The phase-controller is configured to apply an additional phase shift to said one of the first order sidebands substantially π phase-shifted by the optical resonator. This may enable a precisely π phase-shift to be applied at the preselected wavelength within the optical spectrum of the said one of the first order sidebands, so the preselected wavelength is precisely transformed from phase-modulation to amplitude-modulation, sustaining the oscillation.

In an embodiment, the optical phase modulator, the optical phase-shifter and the photodetector are implemented as a photonic integrated circuit.

In an embodiment, the optical ring resonator is a micro-ring resonator, such as a silicon photonic microring resonator. The phase-to-amplitude modulation conversion may reduce the suppression of optical power and exploit the wavelength-selective phase shift of a photonic integrated microring resonator.

In an embodiment, the optical resonator is configured to apply the substantially π phase-shift at a preselected range of wavelengths within the optical spectrum of said one of the first order sidebands. The optical resonator may therefore apply the phase shift to a narrow band spectral region within the optical spectrum of said one of the first order sidebands.

In an embodiment the opto-electronic oscillator further comprises an optical output and an optical splitter configured to power split the optical signal output from the optical phase shifter into a first part and a second part. The opto-electronic oscillator is configured to deliver the first part to the photodetector and to deliver the second part to the optical output. The OEO thereby additionally outputs an optical signal having an amplitude modulation at the frequency of the electrical carrier signal.

In an embodiment, the frequency of the electrical carrier signal is one of a radio-frequency, microwave and millimetre wave frequency.

In an embodiment, the optical phase modulator is configured to apply a sinusoidal phase modulation having a low modulation index to the optical carrier signal. This may ensure that only first order sidebands are generated.

Corresponding embodiments are also applicable for each of the optical bandpass filter, the wireless communications transmitter, the wireless communications receiver, the wireless communications transceiver and the beamforming antenna according to the further aspects of the invention described below.

A further aspect of the invention provides an optical bandpass filter comprising an optical source, an optical phase modulator, an optical phase shifter and a photodetector. The optical source is configured to generate an optical carrier signal having a carrier wavelength. The optical phase modulator is configured to apply a sinusoidal phase modulation to the optical carrier signal to thereby generate two first order sidebands, located on either side of the optical carrier signal respectively. The two first order sidebands have a r phase difference between them. The optical phase shifter comprises an optical resonator configured to apply a substantially $\pi$ phase-shift at a preselected wavelength within an optical spectrum of one of the first order sidebands. The photodetector is configured to perform optical heterodyne detection of the optical carrier signal with both said one of the first order sidebands substantially n phase shifted by the optical resonator and the other of the first order sidebands. This generates an electrical output signal having a frequency equal to a frequency difference between the carrier wavelength of the optical carrier signal and the preselected wavelength at which the optical resonator is configured to apply the substantially $\pi$ phase-shift.

The phase modulation performed by this optical bandpass filter, BPF, may have a reduced insertion loss with respect to the amplitude modulation performed by prior art BPFs, and the optical phase shifter does not rely on the suppression of optical power from one of the modulation sidebands, but rather on the $\pi$ phase shift of a portion of the optical spectrum of one of the modulation sidebands. This may improve the efficiency of the BPF, reducing losses of optical power. The BPF may therefore improve the exploitation of the optical power, and reduce the phase noise of the generated electronic output signal, as compared to prior art BPFs. Moreover, a phase modulation may be more robust than an amplitude modulation, since it does not require the control of any modulation bias.

A further aspect of the invention provides a wireless communications transceiver comprising an opto-electronic oscillator, signal upconversion apparatus and signal downconversion apparatus. The opto-electronic oscillator comprises an optical source, an optical phase modulator, an optical phase shifter and a photodetector. The optical source is configured to generate an optical carrier signal having a carrier wavelength. The optical phase modulator is configured to apply a sinusoidal phase modulation to the optical carrier signal to thereby generate two first order sidebands, located on either side of the optical carrier signal respectively. The two first order sidebands have a $\pi$ phase difference between them. The optical phase shifter comprises an optical resonator configured to apply a substantially $\pi$ phase-shift at a preselected wavelength within an optical spectrum of one of the first order sidebands. The photodetector is configured to perform optical heterodyne detection of the optical carrier signal with both said one of the first order sidebands substantially at phase shifted by the optical resonator and the other of the first order sidebands. This generates an electrical carrier signal having a frequency equal to a frequency difference between the carrier wavelength of the optical carrier signal and the preselected wavelength at which the optical resonator is configured to apply the substantially $\pi$ phase-shift. A first part of the electrical carrier signal is delivered to an electrical output of the opto-electronic oscillator. A second part of the electrical carrier signal is delivered to the optical phase modulator as a drive signal for the optical phase modulator. The signal upconversion apparatus is arranged to: receive a first part of the electrical carrier signal output from the opto-electronic oscillator; receive a transmission signal; and add the transmission signal to the first part of the electrical carrier signal to form an upconverted transmission signal. The signal downconversion apparatus is arranged to receive a second part of the electrical carrier signal output from the opto-electronic oscillator; receive a received signal; and subtract the second part of the electrical carrier signal from the received signal to form a downconverted received signal.

A further aspect of the invention provides a wireless communications transmitter comprising an opto-electronic oscillator, an input and signal upconversion apparatus. The opto-electronic oscillator comprises an optical source, an optical phase modulator, an optical phase shifter and a photodetector. The optical source is configured to generate an optical carrier signal having a carrier wavelength. The optical phase modulator is configured to apply a sinusoidal phase modulation to the optical carrier signal to thereby generate two first order sidebands located on either side of the optical carrier signal respectively. The two first order sidebands have a $\pi$ phase difference between them. The optical phase shifter comprises an optical resonator configured to apply a substantially $\pi$ phase-shift at a preselected wavelength within an optical spectrum of one of the first order sidebands. The photodetector is configured to perform optical heterodyne detection of the optical carrier signal with both said one of the first order sidebands substantially $\pi$ phase shifted by the optical resonator and the other of the first order sidebands. This generates an electrical carrier signal having a frequency equal to a frequency difference between the carrier wavelength of the optical carrier signal and the preselected wavelength at which the optical resonator is configured to apply the substantially $\pi$ phase-shift. A first part of the electrical carrier signal is delivered to an electrical output of the opto-electronic oscillator. A second part of the electrical carrier signal is delivered to the optical phase modulator as a drive signal for the optical phase modulator. The input is arranged to receive a wireless communications signal for transmission on the electrical carrier signal output from the opto-electronic oscillator. The signal upconversion is arranged to: receive the electrical carrier signal output from the opto-electronic oscillator; receive the wireless communications signal for transmission; and add the wireless communications signal for transmission to the electrical carrier signal to form an upconverted wireless communications signal for transmission.

A further aspect of the invention provides a wireless communications receiver comprising an opto-electronic oscillator, an input and signal downconversion apparatus. The opto-electronic oscillator comprises an optical source, an optical phase modulator, an optical phase shifter and a photodetector. The optical source is configured to generate an optical carrier signal having a carrier wavelength. The optical phase modulator is configured to apply a sinusoidal phase modulation to the optical carrier signal to thereby generate two first order sidebands located on either side of the optical carrier signal respectively. The two first order sidebands have a $\pi$ phase difference between them. The optical phase shifter comprises an optical resonator configured to apply a substantially π phase-shift at a preselected wavelength within an optical spectrum of one of the first order sidebands. The photodetector is configured to perform optical heterodyne detection of the optical carrier signal with both said one of the first order sidebands substantially π phase shifted by the optical resonator and the other of the first order sidebands. This generates an electrical carrier signal having a frequency equal to a frequency difference between the carrier wavelength of the optical carrier signal and the preselected wavelength at which the optical resonator is configured to apply the substantially π phase-shift. A first part of the electrical carrier signal is delivered to an electrical output of the opto-electronic oscillator. A second part of the electrical carrier signal is delivered to the optical phase modulator as a drive signal for the optical phase modulator. The input is arranged to receive a wireless communications signal. The signal downconversion apparatus is arranged to: receive the electrical carrier signal output from the opto-electronic oscillator; receive the received wireless communications signal; and subtract the electrical carrier signal from the received wireless communications signal to form an downconverted received wireless communications signal.

A beamforming antenna comprising an opto-electronic oscillator, an input and a plurality of radio frequency antennas. The opto-electronic oscillator comprises an optical source, an optical phase modulator, an optical phase shifter and a photodetector. The optical source is configured to generate an optical carrier signal having a carrier wavelength. The optical phase modulator is configured to apply a sinusoidal phase modulation to the optical carrier signal to thereby generate two first order sidebands, located on either side of the optical carrier signal respectively. The two first order sidebands have a π phase difference between them. The optical phase shifter comprises an optical resonator configured to apply a substantially π phase-shift at a preselected wavelength within an optical spectrum of one of the first order sidebands. The photodetector is configured to perform optical heterodyne detection of the optical carrier signal with both said one of the first order sidebands substantially a phase shifted by the optical resonator and the other of the first order sidebands. This generates an electrical carrier signal having a frequency equal to a frequency difference between the carrier wavelength of the optical carrier signal and the preselected wavelength at which the optical resonator is configured to apply the substantially r phase-shift. A first part of the electrical carrier signal is delivered to an electrical output of the opto-electronic oscillator. A second part of the electrical carrier signal is delivered to the optical phase modulator as a drive signal for the optical phase modulator. The input is arranged to receive a signal for transmission on the electrical carrier signal output from the opto-electronic oscillator. The radio frequency antennas are configured to transmit the electrical carrier signal carrying the signal for transmission.

A further aspect of the invention provides a method of generating an electrical carrier signal. The method comprises receiving an optical carrier signal having a carrier wavelength. The method comprises applying a sinusoidal phase modulation to the optical carrier signal to thereby generate two first order sidebands, located on either side of the optical carrier signal respectively. The two first order sidebands have a π phase difference between them. The method comprises applying a substantially π phase-shift at a preselected wavelength within an optical spectrum of one of the first order sidebands. The method comprises performing optical heterodyne detection of the optical carrier signal with both said one of the first order sidebands substantially π phase shifted by the optical resonator and the other of the first order sidebands to generate an electrical carrier signal having a frequency equal to a frequency difference between the carrier wavelength of the optical carrier signal and the preselected wavelength at which the substantially π phase-shift is applied. The method comprises providing a part of the electrical carrier signal to drive the sinusoidal phase modulation.

The phase modulation performed by this method may result in a reduced insertion loss with respect to the amplitude modulation performed by the prior art OEOs. and the method does not rely on the suppression of optical power from one of the modulation sidebands but rather on the n phase shift of a portion of the optical spectrum of one of the modulation sidebands. This may improve the efficiency of generating an electrical carrier signal, reducing losses of optical power. The method may therefore improve the exploitation of the optical power, and reduce the phase noise of the generated electronic carrier signal, as compared to prior art OEOs. Moreover, a phase modulation may be more robust than an amplitude modulation, since it does not require the control of any modulation bias.

In an embodiment, the method further comprising tuning the preselected wavelength within the optical spectrum of said one of the first order side bands at which the phase-shift is applied. The method may thereby tune the frequency of the electrical carrier signal frequency.

In an embodiment, the phase-shift is applied using an optical ring resonator. Both the phase modulation and the phase shift are therefore characterized by low losses, which may optimize the performance of the method in terms of phase noise. Use of an optical ring resonator to apply the phase-shift may enable the method to generate an electrical carrier signal frequency with a widely tuneable frequency without requiring use of a tuneable laser.

In an embodiment, the method comprises tuning a resonant wavelength of the optical ring resonator within the optical spectrum of said one of the first order side bands. The preselected wavelength at which the optical ring resonator applies the substantially a phase shift is therefore tuneable within the range of wavelengths falling within the optical spectrum of the said one of the first order side bands. The frequency of the electrical carrier signal may therefore be tuned.

In an embodiment, the phase-shift is applied using an optical ring resonator configured as an all-pass filter. This may give the optical ring resonator a flat amplitude response, so it does not supress optical power. Applying the phase-shift using an optical ring resonator configured as an all-pass filter may cause a precisely π phase-shift to be applied at the preselected wavelength within the optical spectrum of the said one of the first order sidebands, so the preselected wavelength is precisely transformed from phase-modulation to amplitude-modulation, sustaining the oscillation.

In an embodiment, the phase-shift is applied using an optical ring resonator configured as an add-drop filter. Applying the phase-shift using an optical ring resonator configured as an add-drop filter may result in very low in-band attenuation, for example less than 1 dB.

In an embodiment, the method further comprises applying an additional phase shift to said one of the first order sidebands substantially π phase-shifted by the optical resonator. This may enable a precisely π phase-shift to be applied at the preselected wavelength within the optical spectrum of the said one of the first order sidebands, so the preselected wavelength is precisely transformed from phase-modulation to amplitude-modulation, sustaining the oscillation.

In an embodiment, the method comprises applying the substantially π phase-shift at a preselected range of wavelengths within the optical spectrum of said one of the first order sidebands. The method may therefore apply the phase shift to a narrow band spectral region within the optical spectrum of said one of the first order sidebands.

In an embodiment, the frequency of the electrical carrier signal is one of a radio-frequency, microwave and millimetre wave frequency.

In an embodiment, the sinusoidal phase modulation has a low modulation index. Only first order sidebands will therefore be generated.

Corresponding embodiments are also applicable for each of the methods according to the further aspects of the invention described below.

A further aspect of the invention provides a method of transmitting a wireless communications signal. The method comprises generating an electrical carrier signal, receiving a wireless communications signal for transmission, and adding the wireless communications signal for transmission to the electrical carrier signal to form an upconverted wireless communications signal for transmission. The electrical carrier signal is generated by receiving an optical carrier signal having a carrier wavelength, applying a sinusoidal phase modulation to the optical carrier signal to thereby generate two first order sidebands, located on either side of the optical carrier signal respectively, the two first order sidebands have a π phase difference between them, applying a substantially π phase-shift at a preselected wavelength within an optical spectrum of one of the first order sidebands; performing optical heterodyne detection of the optical carrier signal with both said one of the first order sidebands substantially π phase shifted by the optical resonator and the other of the first order sidebands to generate an electrical carrier signal having a frequency equal to a frequency difference between the carrier wavelength of the optical carrier signal and the preselected wavelength at which the substantially π phase-shift is applied; and providing a part of the electrical carrier signal to drive the sinusoidal phase modulation.

A further aspect of the invention provides a method of receiving a wireless communications signal. The method comprises generating an electrical carrier signal, receiving a wireless communications signal, and subtracting the electrical carrier signal from the received wireless communications signal to form a downconverted wireless communications signal. The electrical carrier signal is generated by receiving an optical carrier signal having a carrier wavelength; applying a sinusoidal phase modulation to the optical carrier signal to thereby generate two first order sidebands, located on either side of the optical carrier signal respectively the two first order sidebands have a π phase difference between them, applying a substantially π phase-shift at a preselected wavelength within an optical spectrum of one of the first order sidebands; performing optical heterodyne detection of the optical carrier signal with both said one of the first order sidebands substantially π phase shifted by the optical resonator and the other of the first order sidebands, to generate an electrical carrier signal having a frequency equal to a frequency difference between the carrier wavelength of the optical carrier signal and the preselected wavelength at which the substantially π phase-shift is applied, and providing a part of the electrical carrier signal to drive the sinusoidal phase modulation.

A method of beamforming comprising generating an electrical carrier signal, receiving a wireless communications signal, applying the wireless communications signal onto the electrical carrier signal to form a signal for transmission, power splitting the signal for transmission into a plurality of sub-signals and applying a respective phase shift to each sub-signal, and transmitting each phase shifted sub-signal from a respective antenna. The electrical carrier signal is generated by receiving an optical carrier signal having a carrier wavelength; applying a sinusoidal phase modulation to the optical carrier signal to thereby generate two first order sidebands, located on either side of the optical carrier signal respectively, the two first order sidebands have a π phase difference between them; applying a substantially π phase-shift at a preselected wavelength within an optical spectrum of one of the first order sidebands; performing optical heterodyne detection of the optical carrier signal with both said one of the first order sidebands substantially a phase shifted by the optical resonator and the other of the first order sidebands, to generate an electrical carrier signal having a frequency equal to a frequency difference between the carrier wavelength of the optical carrier signal and the preselected wavelength at which the substantially π phase-shift is applied, and providing a part of the electrical carrier signal to drive the sinusoidal phase modulation.

Embodiments of the invention will now be described, by way of example only, with reference to the accompanying drawings.

DETAILED DESCRIPTION

The same reference numbers will be used for corresponding features in different embodiments.

Figure 1:
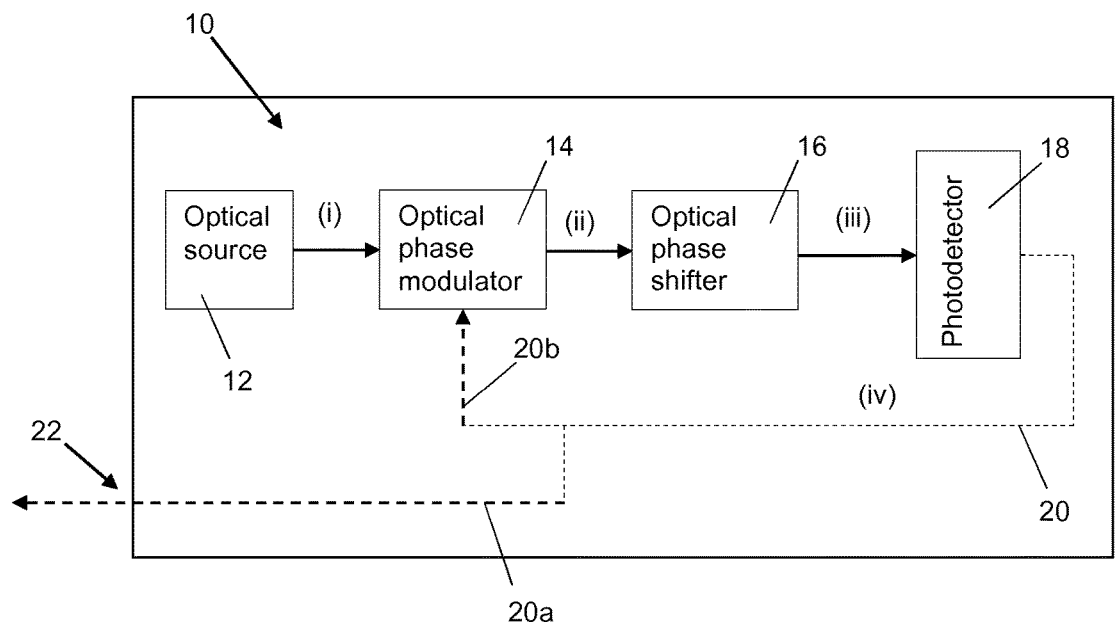
FIG. 1 is a schematic representation of an opto-electronic oscillator according to an embodiment of the invention.

Referring to FIG. 1, an embodiment of the invention provides an opto-electronic oscillator, OEO, 10 comprising an optical source 12, an optical phase modulator 14, an optical phase shifter 16 and a photodetector 18.

The optical source 12 is configured to generate an optical carrier signal having a carrier wavelength, $\lambda_0$. The optical phase modulator 14 is configured to apply a sinusoidal phase modulation to the optical carrier signal to thereby generate two first order sidebands, located on either side of the optical carrier signal respectively. The two first order sidebands have a $\pi$ phase difference between them.

The optical phase shifter 16 comprises an optical resonator configured to apply a substantially $\pi$ phase-shift at a preselected wavelength within an optical spectrum of one of the first order sidebands. It will be understood that an optical resonator is en optical device, or an arrangement of optical components, in which light circulates in a closed path; the $\pi$ phase-shift is applied to light of the preselected wavelength circulating within the optical resonator.

The photodetector 18 is configured to perform optical heterodyne detection of the optical carrier signal with both: the first order sideband that has had the substantially $\pi$ phase shift applied to it by the optical resonator; and the other first order sideband.

As a result of the heterodyning of the optical carrier with the phase-shifted first order side band and with the other first order sideband, an electrical carrier signal 20 is output from the photodetector. The electrical carrier signal has a frequency equal to a frequency difference between the carrier wavelength of the optical carrier signal and the preselected wavelength at which the optical resonator is configured to apply the substantially $\pi$ phase-shift.

A first part of the electrical carrier signal 20a is delivered to an electrical output 22 of the opto-electronic oscillator. A second part of the electrical carrier signal 20b is delivered via an electrical feedback loop to the optical phase modulator as a drive signal for the optical phase modulator; this ensures oscillation of the OEO In an embodiment, the frequency of the electrical carrier signal is one of a radio-frequency, RF, microwave and millimetre wave frequency.

Figure 2:
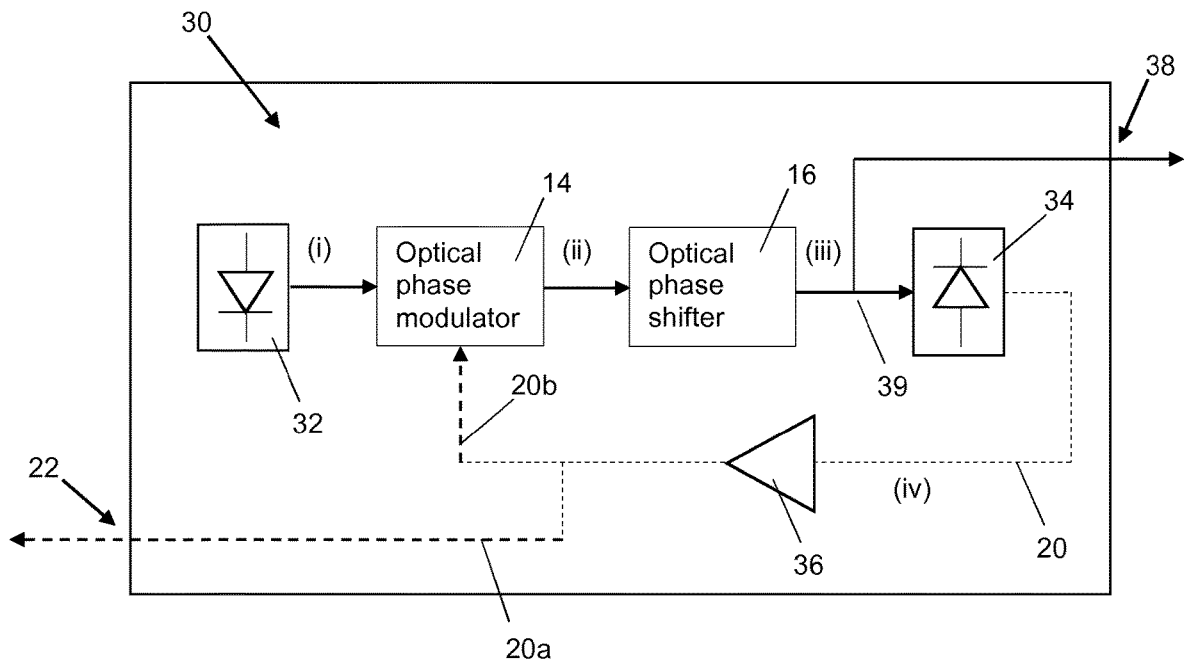
FIG. 2 is a schematic representation of an opto-electronic oscillator according to an embodiment of the invention.

FIG. 2 shows an OEO 30 according to another embodiment of the invention. In this embodiment the optical source is a laser 32 and the photodetector is a photodiode 34. The OEO 30 comprises a broadband electrical amplifier 36 in the electrical feedback loop from the output of the photodiode to the optical phase modulator.

The OEO 30 further comprises an optical output 38 and an optical splitter 39 configured to power split the optical signal output from the optical phase shifter into a first part and a second part. The OEO is configured to deliver the first part to the photodetector and to deliver the second part to the optical output. The optical signal that is output has an amplitude modulation at the frequency of the electrical carrier signal.

Figure 3:
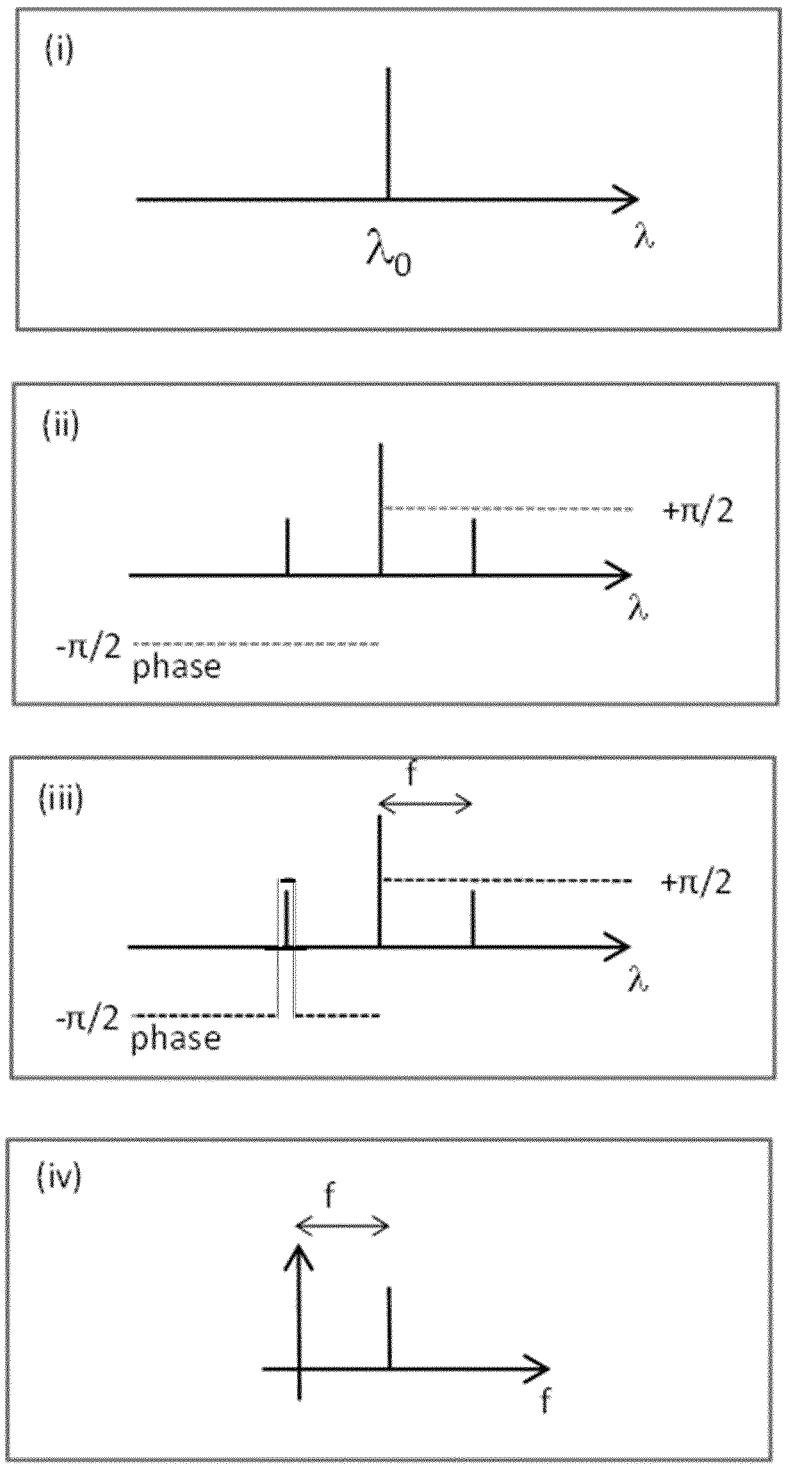
FIG. 3 illustrates the optical and electrical signals at various points within the opto-electronic oscillator of FIG. 2.

The laser 32 emits an optical carrier signal at wavelength $\lambda_0$ (see FIG. 3(i)). The optical phase modulator 14 produces first order sidebands around the optical carrier signal. The optical sidebands have a wavelength of $\lambda_0 \pm f$, where f is the frequency of the sinusoidal phase modulation. If the modulation index of the optical phase modulator is low, the phase modulation produces just one upper sideband and one lower sideband. It will be understood that a low modulation index means a peak phase change of much less than 1 The sidebands are in counter-phase, i.e. the two first order sidebands have a $\pi$ phase difference between them (see FIG. 3(ii); the optical carrier and the first order side bands are indicated by the solid lines and the phase of the side bands is illustrated by the dotted lines indicating a phase of $\pm \pi/2$).

This phase modulation cannot be detected by the photodiode 34, since a photodiode can only detect amplitude modulations. The phase shifter applies a $\pi$ phase shift to a narrowband spectral region within the spectral profile of one of the sidebands, in this example the lower first order sideband (see FIG. 3(ii)). The modulation is thereby converted from a phase-modulation to an amplitude-modulation, only for the preselected wavelength that undergoes the substantially n phase shift.

As a result, the photodiode 34 detects the optical carrier signal, and the two sidebands (one upper and one lower) that are now in phase with each other. The heterodyning of the optical carrier signal with the two sidebands produces an amplitude modulation, which the photodiode detects. The electrical carrier signal generated by the photodiode has a frequency $f_{RF}$, where $f_{RF}$ is the frequency detuning between the laser and the preselected wavelength at which the phase shift is applied by the phase shifter (see FIG. 3(iv)).

The OEO 30 has an electrical output, in this example an RF output. At steady state, the electrical carrier signal is an RF signal at a frequency $f_{RF}$ that depends on the detuning between the laser wavelength and the preselected wavelength at which the phase shifter applied the substantially $\pi$ phase shift.

Part of the electrical carrier signal is delivered to the phase modulator as a drive signal, therefore the OEO 30 sustains the oscillation defined by the detuning (frequency difference) between the laser wavelength and the preselected wavelength at which the phase shifter applied the substantially n phase shift.

The OEO 30 also has an optical output 38. At steady state the optical output is an optical signal with an amplitude modulation at frequency $f_{RF}$.

Figure 4:
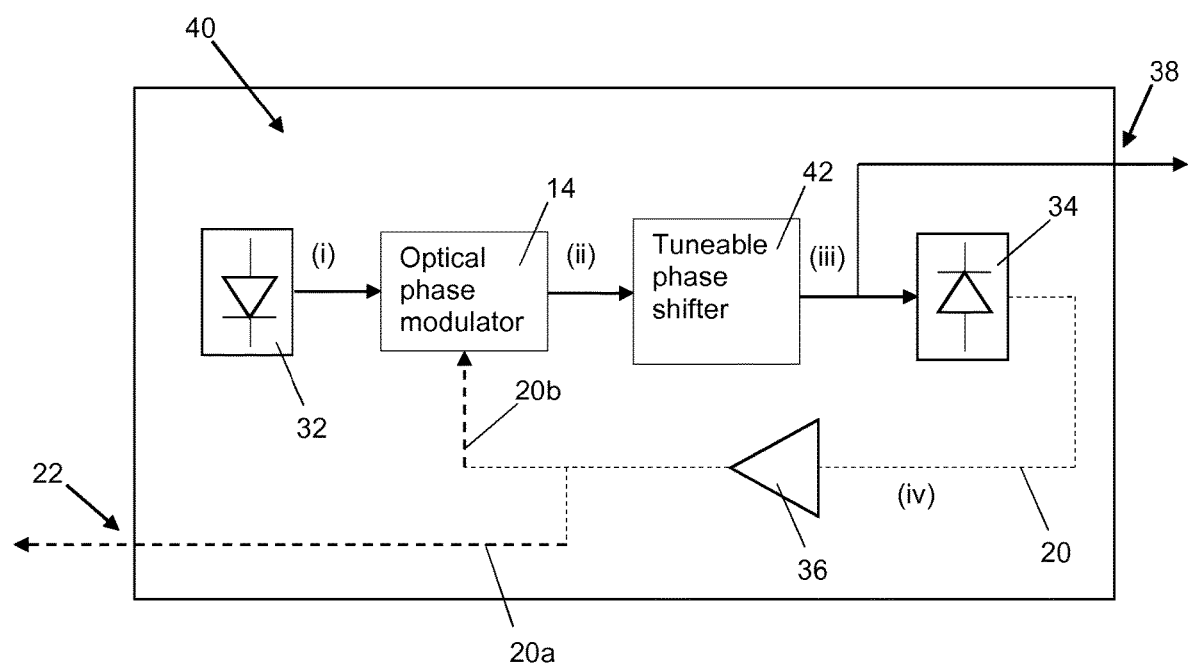
FIG. 4 is a schematic representation of an opto-electronic oscillator according to an embodiment of the invention.

FIG. 4 shows an OEO 40 according to another embodiment of the invention. In this embodiment, the phase shifter is a wavelength tuneable phase shifter 42. The optical resonator of the wavelength tuneable phase shifter is configured such that the preselected wavelength at which the phase-shift is applied is tuneable within the optical spectrum of the said one of the first order side bands. Tuning the preselected wavelength at which the optical resonator 42 applies the phase shift controls the frequency of the electrical carrier signal 20.

In an embodiment, the OEO 40 comprises apparatus configured to tune the reselected wavelength of the optical resonator within the optical spectrum of said one of the first order side bands.

Figure 5:
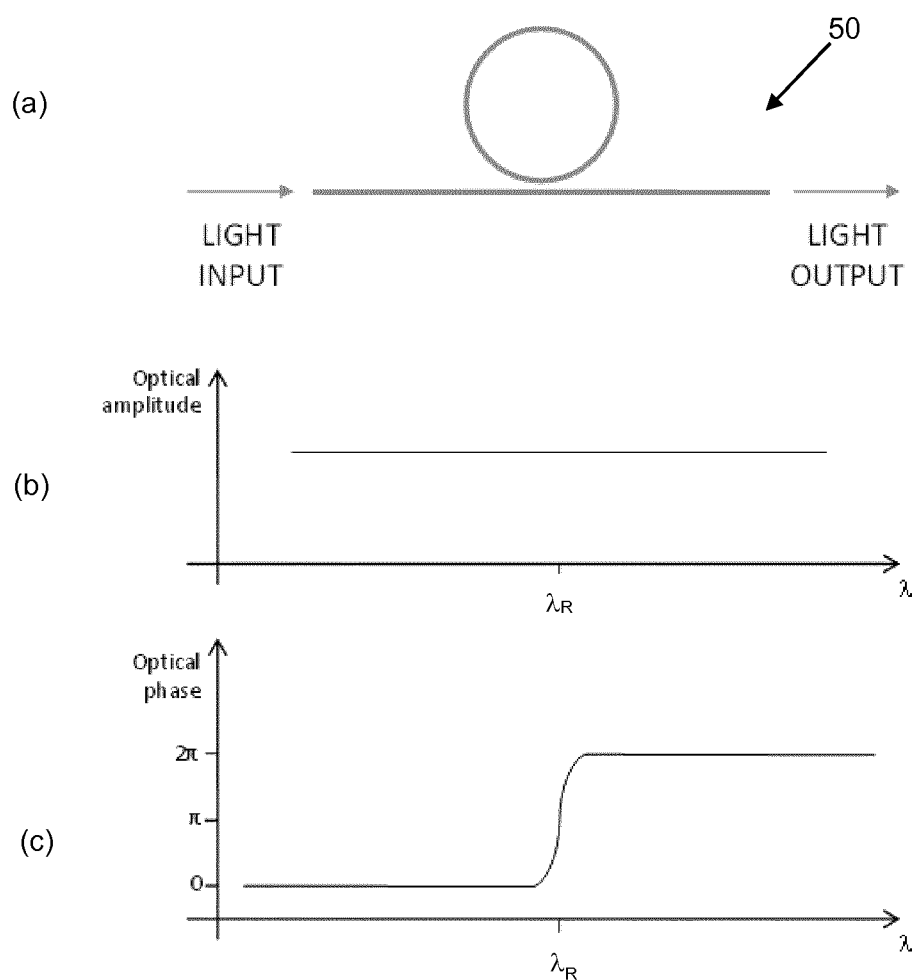
FIG. 5a illustrates an optical amplitude resonator for use as an optical phase shifter in an opto-electronic oscillator as shown in any of FIGS. 1 to 4.
FIG. 5b shows the optical amplitude response of the optical ring resonator of FIG. 5a, FIG. 5c shows the optical phase response of the optical ring resonator of FIG. 5a and FIG. 5d Illustrates the mode coupling within an optical ring resonator.
Figure 5:
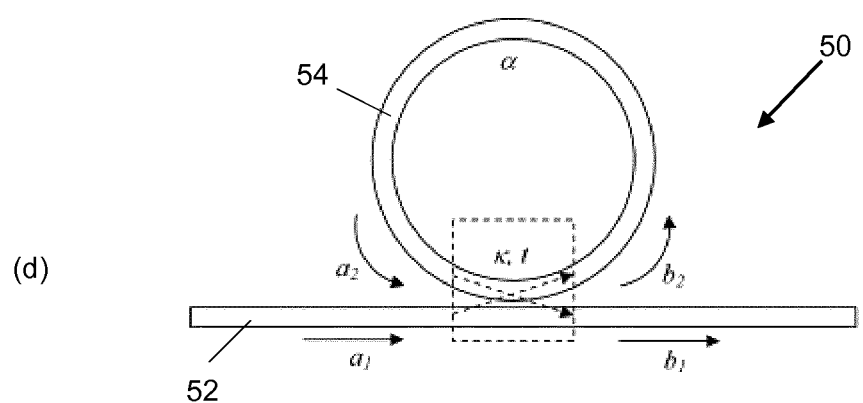

Referring to FIG. 5a, an embodiment of the invention provides an OEO, as shown in FIG. 4, in which the optical resonator is an optical ring resonator 50 configured as an all-pass filter, ORR-APF.

An optical ring resonator is a wavelength selective device that works on the principle of coupling by evanescent wave overlap between the optical modes in a straight waveguide 52 and a ring waveguide 54, as illustrated by the dotted lines in FIG. 5d. The interaction between the ring and the straight waveguides can be described by coupled mode theory:

$$b_1 = \alpha_1 t + \kappa \alpha_2$$

$$b_2 = -\kappa^- \alpha_1 + 1 t' \alpha_2$$

where κ and t are the electric field coupling coefficient and transmission coefficients respectively and the complex mode electric field magnitudes $b_1$, $a_1$ are normalized such that the squared magnitude corresponds to the modal power.

The theoretical performance of the ORR-APF 50 has a flat amplitude response (FIG. 5b), so it does not supress optical power, and it has a phase change of 2π from one side of its resonant wavelength, $\lambda_R$, to the other, passing by a phase shift of π at its resonant wavelength (FIG. 5c).

In an embodiment, the ORR-APF 50 is a microring resonator, MRR-APF. A microring resonator is a small optical ring resonator fabricated as a waveguide device. The microring resonator used here is a silicon waveguide device and optical phase-modulator 14, tuneable phase shifter 42 and the photodiode 34 are formed as a photonic integrated circuit. An integrated photonic implementation may ensure stable behaviour of the OEO against environmental fluctuations, such as vibrations and thermal variations, and may enable an ultra-compact ultra-stable wideband-tuneable OEO to be provided.

In an embodiment, the ORR-APF 50 is configured to apply π phase-shift at a preselected range of wavelengths around its resonant wavelength, within the optical spectrum of one of the first order sidebands. The ORR-APF 50 may therefore apply π phase-shift to a narrow band spectral region within the optical spectrum of that first order sideband.

In a further embodiment the electrical feedback loop and the broadband electrical amplifier 36 are formed as a silicon integrated device, further reducing the size of the OEO.

Figure 6:
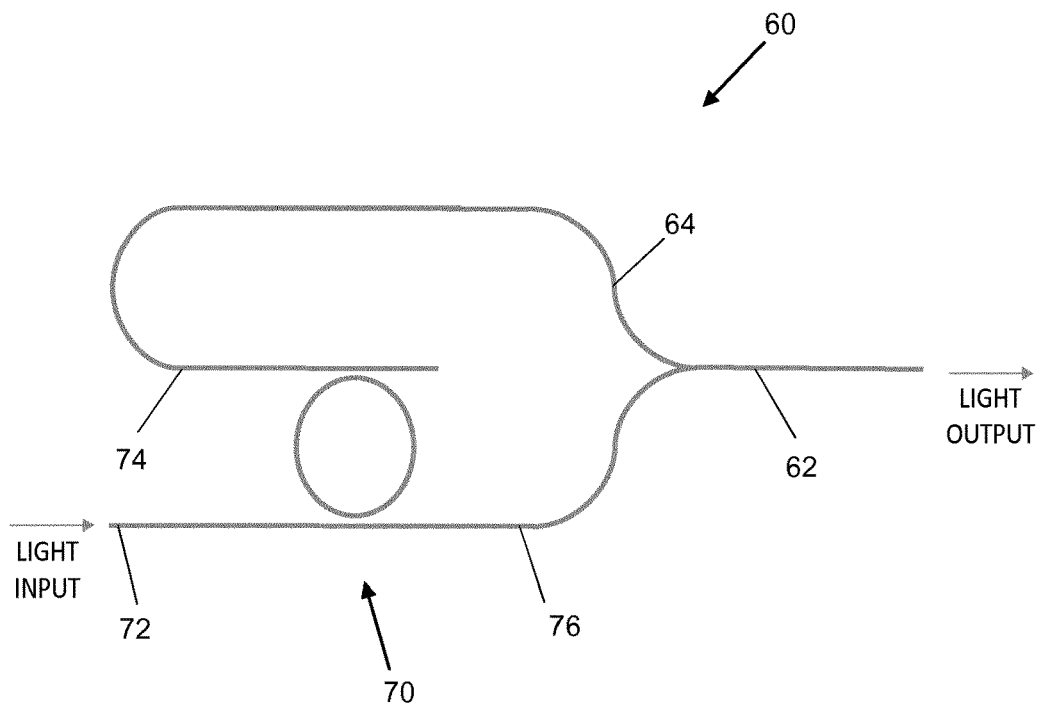
FIG. 6 illustrates an optical ring resonator for use as an optical phase shifter in an opto-electronic oscillator as shown in any of FIGS. 1 to 4.
Figure 7:
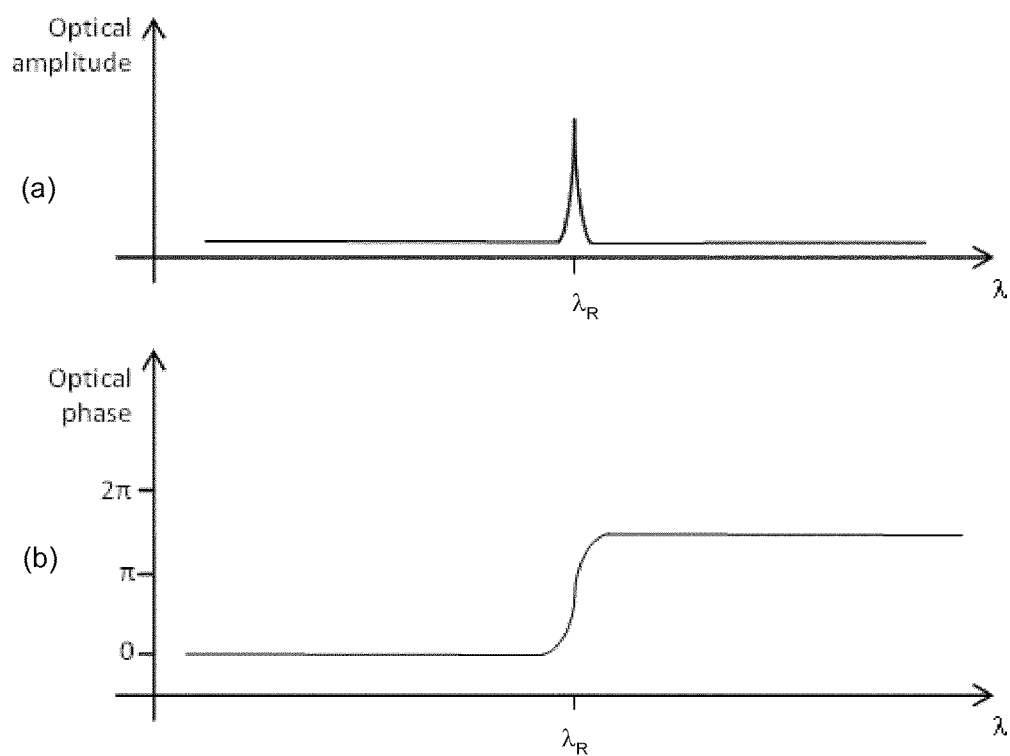
FIG. 7a shows the optical amplitude response of the optical ring resonator of FIG. 6
FIG. 7b shows the optical phase response of the optical ring resonator of FIG. 6.

Referring to FIGS. 6 and 7, an embodiment of the invention provides an OEO, as shown in FIG. 4, in which the wavelength tuneable phase-shifter 60 comprises an optical ring resonator configured as an add-drop filter, ORR-A/D 70.

The ORR-A/D comprises an input port 72, a drop port 74 and a throughput port 76. The input port 72 is configured to receive the optical carrier signal and the two first order sidebands from the phase modulator 14. The drop port 74 is configured to output the first order sideband to which the substantially π phase-shift has been applied. The throughput port 76 is configured to output the optical carrier signal, wavelengths other than the resonant wavelength of the ORR-A/D 70 and the other first order sideband.

The wavelength tuneable phase shifter 60 also comprises a first optical path 62 from the throughput port to the photodetector 34 and a second optical path 64 coupling the drop port to the first optical path.

As shown in FIGS. 7a and 7b, the ORR-A/D 70 has a theoretical response of a selective amplitude filter that is associated to a phase shift at its resonant wavelength, $\lambda_R$; the phase shift does not reach 2π and the phase-shift that is applied at the resonant wavelength may not be precisely π. The in-band attenuation can be very low (<1 dB).

The ORR-A/D therefore selects and phase-shifts a portion of the optical spectrum of one of the first order sidebands. As a result of the second optical path 64 coupling the drop port 74 to the first optical path 62, the phase-shifted portion of the optical spectrum of one of the first order sidebands is then re-added to the optical carrier signal, the wavelength of the said first order sideband not phase-shifted by the ORR-A/D and the other first order sideband, this gives the phase-shifter 60 a flat amplitude response.

In an embodiment, the ORR-A/D 70 is a microring resonator, MRR-A/D. The microring resonator used here is a silicon waveguide device and optical phase-modulator 14, tuneable phase shifter 42 and the photodiode 34 are formed as a photonic integrated circuit. An integrated photonic implementation may ensure stable behaviour of the OEO against environmental fluctuations, such as vibrations and thermal variations, and may enable an ultra-compact ultra-stable wideband-tuneable OEO to be provided.

In an embodiment the ORR-A/D 70 is configured to apply a substantially π phase-shift at a preselected range of wavelengths about its resonant wavelength, within the optical spectrum of one of the first order sidebands. The ORR-A/D 70 may therefore apply a substantially π phase-shift to a narrow band spectral region within the optical spectrum of that first order sideband.

Figure 8:
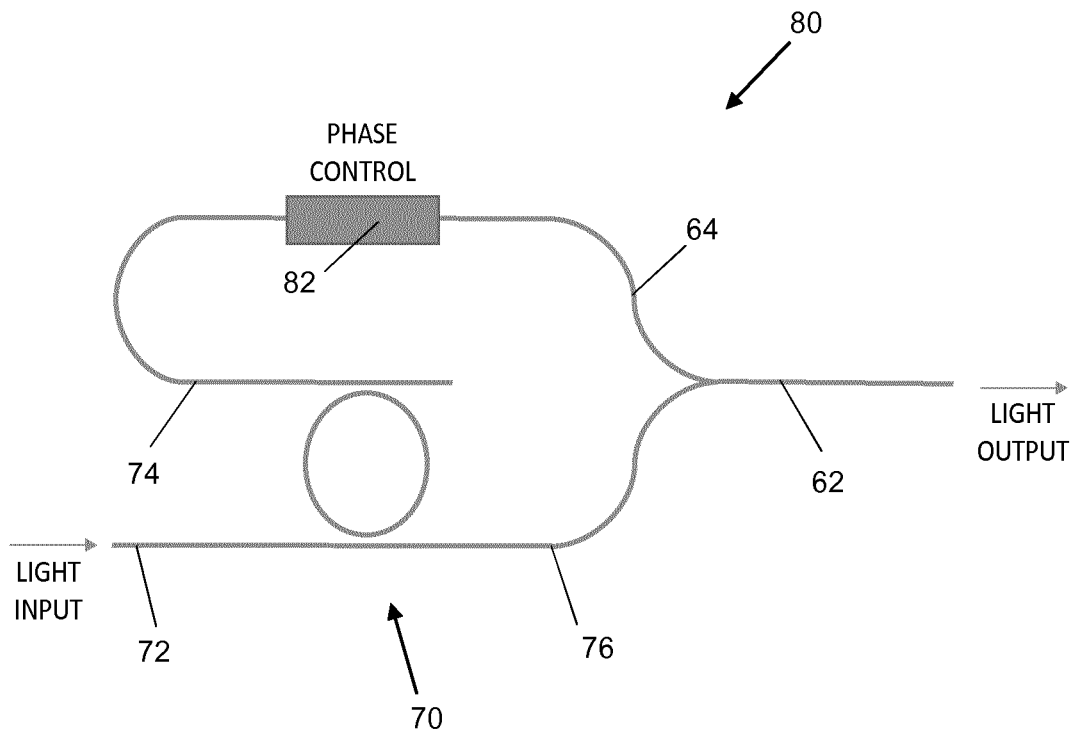
FIG. 8 illustrates an optical ring resonator for use as an optical phase shifter in an opto-electronic oscillator as shown in any of FIGS. 1 to 4.

In a further embodiment, illustrated in FIG. 8, the wavelength tuneable phase-shifter 80 additionally comprises a broadband phase shifter 82 to bias the phase shifting so that light at the resonant wavelength of the ORR-A/D 70, which may be an MRR-A/D, is perfectly π phase-shifted.

Figure 9:
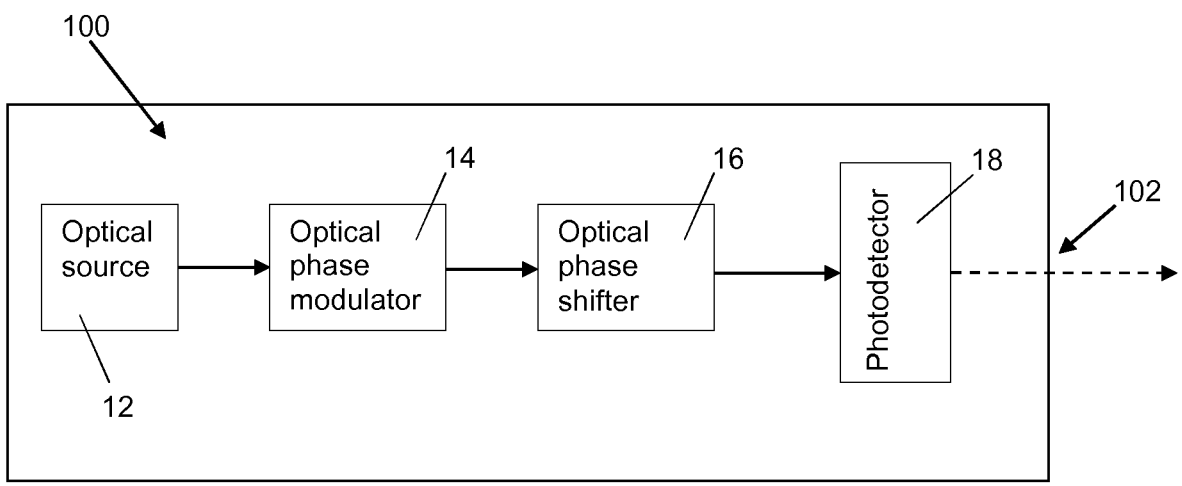
FIGS. 9 to 11 are schematic representations of microwave photonic bandpass filters, BPF, according to embodiments of the invention.

Referring to FIG. 9, a further embodiment of the invention provides an optical bandpass filter, BPF, 100 comprising an optical source 12, an optical phase modulator 14, an optical phase shifter 16, a photodetector 18 and an output 102.

The BPF 100 is similar to the OEO 10 described with reference to FIG. 1, with the modification that the electrical output signal from the photodetector 18 is simply delivered to an electrical signal output 102.

Figure 10:
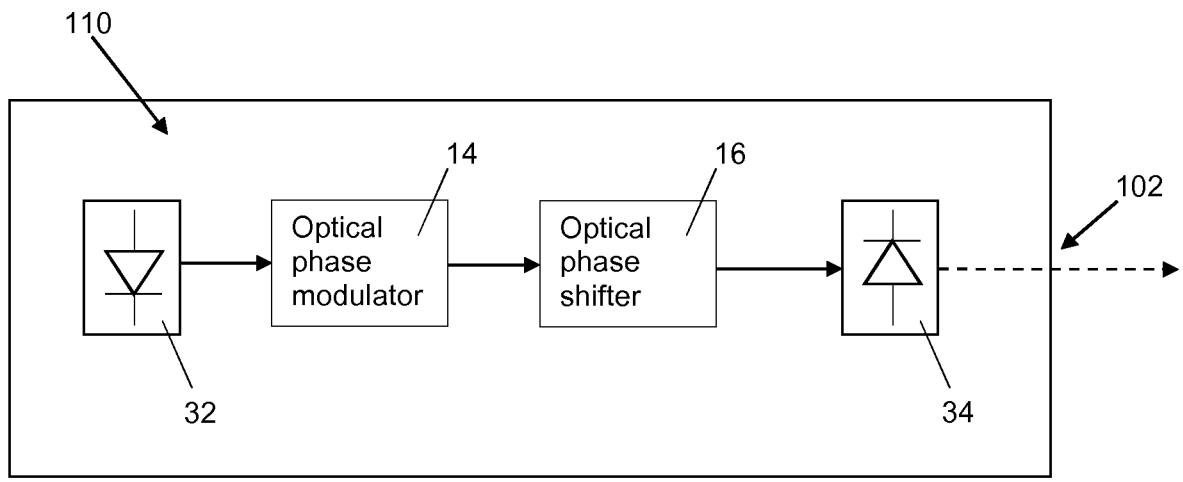

Referring to FIG. 10, another embodiment of the invention provides a BPF 110 which is similar to the OEO 30 described above with reference to FIG. 2. As in the OEO 30 of FIG. 2, in this embodiment the optical source is a laser 32 and the photodetector is a photodiode 34.

Figure 11:
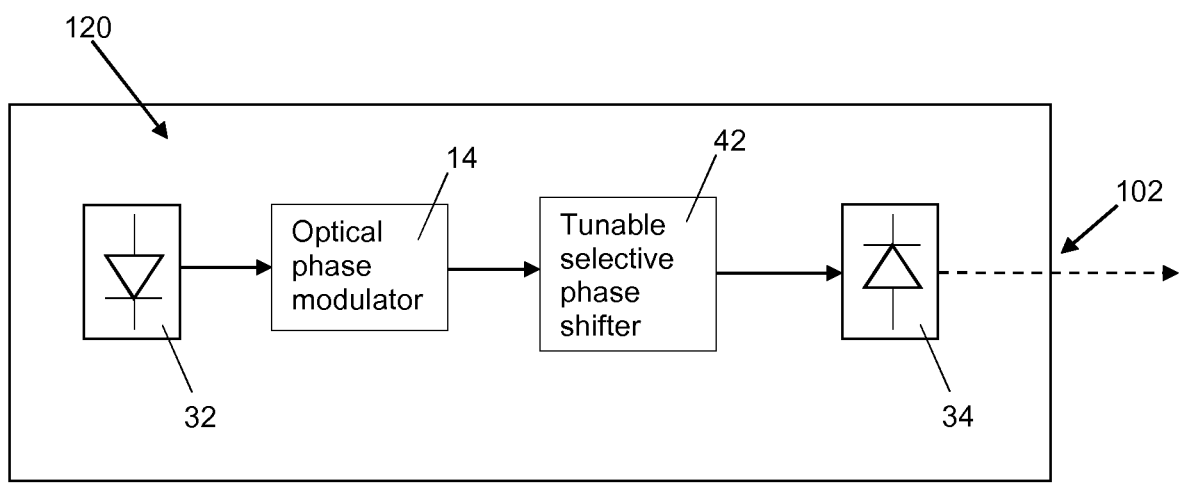

Referring to FIG. 11, another embodiment of the invention provides a BPF 120 which is similar to the OEO 40 described above with reference to FIG. 4. As in the OEO 40 of FIG. 4, in this embodiment the phase shifter is a wavelength tuneable phase shifter 42. The optical resonator of the wavelength tuneable phase shifter is configured such that the preselected wavelength at which the phase-shift is applied is tuneable within the optical spectrum of the said one of the first order side bands. Tuning the preselected wavelength at which the optical resonator 42 applies the phase shift controls the frequency of the electrical carrier signal 20.

In an embodiment, the BPF 120 comprises apparatus configured to tune the preselected wavelength of the optical resonator within the optical spectrum of said one of the first order side bands.

In further embodiments, the optical resonator of the optical phase shifter 42 is an optical ring resonator 50 configured as an all-pass filter, ORR-APF, as described above with reference to FIG. 5. In an embodiment, the ORR-APF is an MRR-APF.

Figure 12:
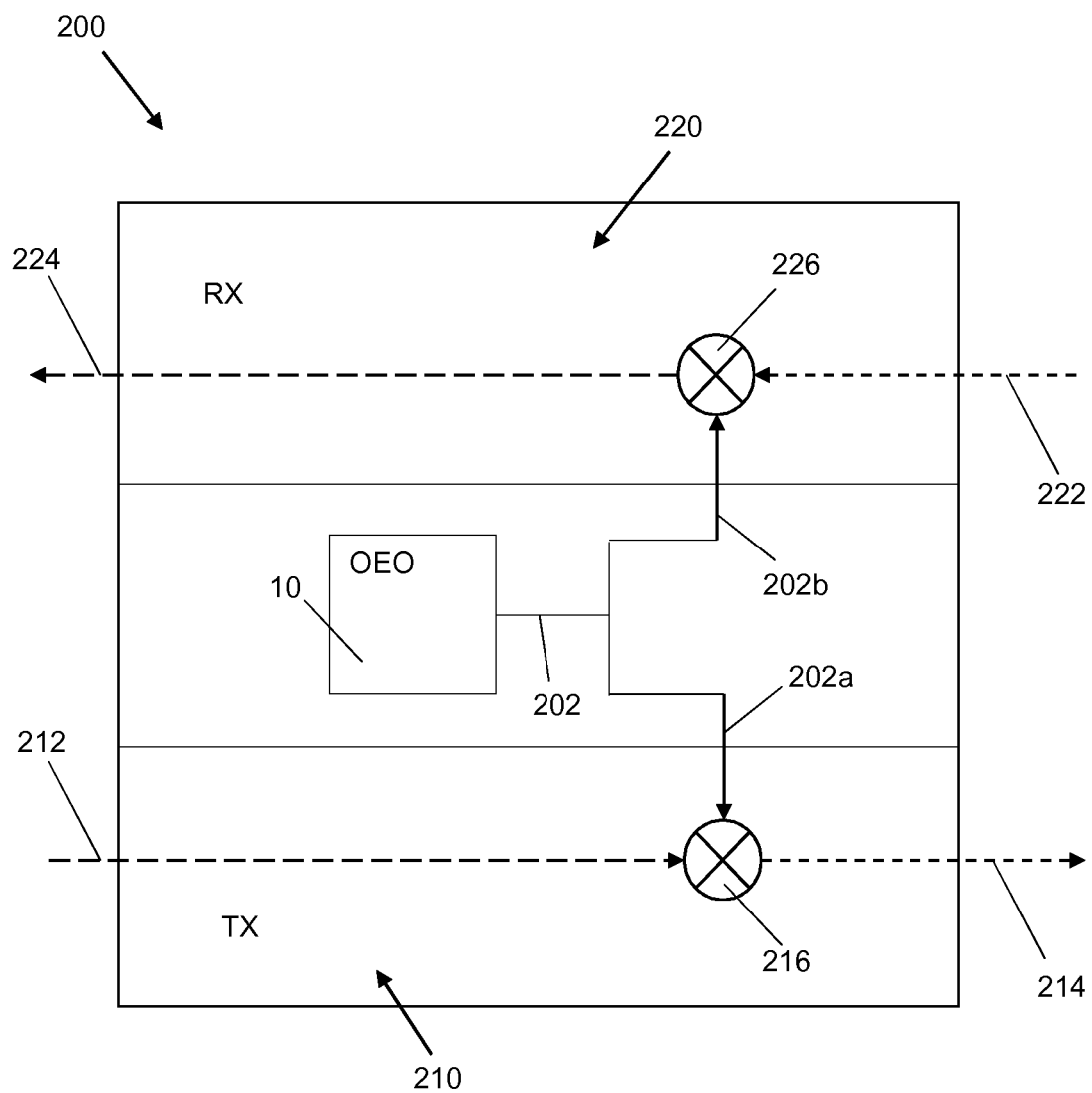
FIG. 12 is a schematic representation of a wireless communications transceiver according to an embodiment of the invention.

In further embodiments, the optical resonator of the optical phase shifter 42 is an optical ring resonator 50 configured as an add-drop filter, ORR-A/D 70, as described above with reference to FIGS. 6 and 7, and may additionally comprise a broadband phase shifter 82, as described above with reference to FIG. 8. In an embodiment, the ORR-APF is an MRR-APF Referring to FIG. 12, an embodiment of the invention provides a wireless communications transceiver 200 comprising an OEO 10, as described above with reference to FIG. 1, signal upconversion apparatus 210 and signal downconversion apparatus 220.

The signal upconversion apparatus is arranged to receive a first part 202a of the electrical carrier signal output from the OEO and to receive a transmission signal 212. The electrical carrier signal has a carrier frequency, F_LO and the transmission signal has an intermediate frequency, F_IF. The signal upconversion apparatus is arranged to add the transmission signal to the first part of the electrical carrier signal, using for example a mixer 216, to form an upconverted transmission signal 214 having a transmission frequency. F_RF=F_LO+F_IF.

The signal downconversion apparatus 220 is arranged to receive a second part 202b of the electrical carrier signal output from OEO and to receive a received signal 222. The received signal has the transmission frequency. F_RF. The signal downconversion apparatus 220 is arranged to subtract the second part of the electrical carrier signal, using for example a mixer 226, from the received signal to form a downconverted received signal 224 having an intermediate frequency, F_IF=F_RF−F_LO.

It will be appreciated that an OEO 30, 40, 50, 60, 80 according to any of the embodiments described above may alternatively be used.

Figure 13:
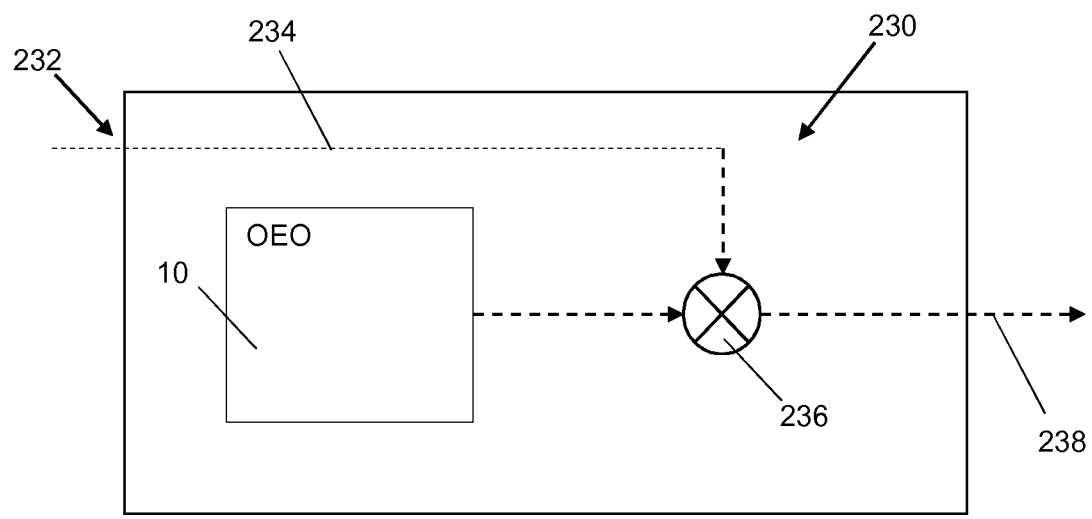
FIG. 13 is a schematic representation of a wireless communications transmitter according to an embodiment of the invention.

Referring to FIG. 13, an embodiment of the invention provides a wireless communications transmitter 230 comprising an OEO 10, as described above with reference to FIG. 1 and an input 232 arranged to receive a transmission signal 234 for transmission on the electrical carrier signal output from the OEO. Signal upconversion apparatus, for example a mixer 236 is provided to add the transmission signal to the electrical carrier signal to form an upconverted transmission signal 238.

It will be appreciated that an OEO 30, 40, 50, 60, 80 according to any of the embodiments described above may alternatively be used.

Figure 14:
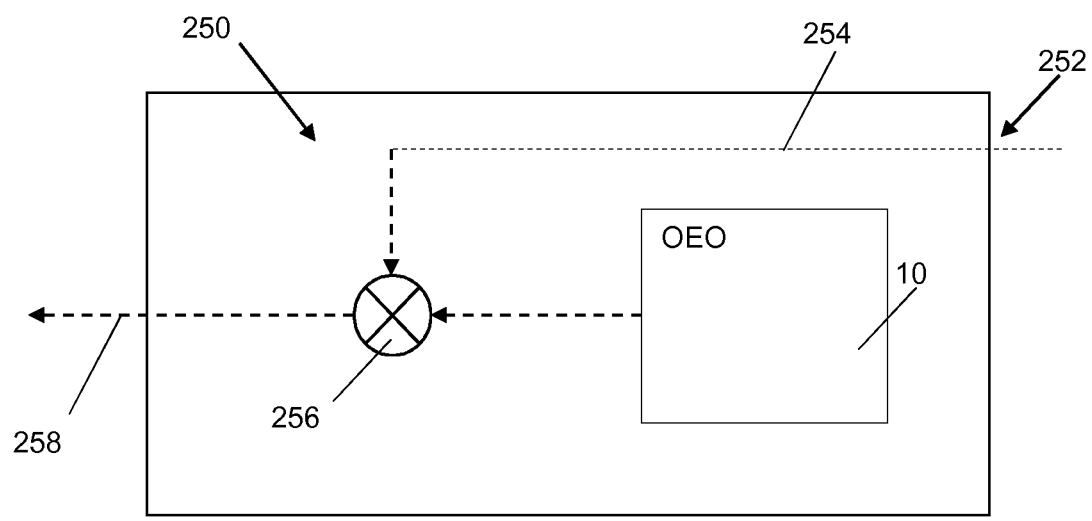
FIG. 14 is a schematic representation of a wireless communications receiver according to an embodiment of the invention.

A further embodiment of the invention provides a wireless communications receiver 250, described with reference to FIG. 14. The wireless communications receiver 250 comprises an OEO 10, as described above with reference to FIG. 1, and an input 252 arranged to receive a received wireless communications signal 254. Signal downconversion apparatus, for example a mixer 256 is provided to subtract the electrical carrier signal from the received signal to form a downconverted received signal 258.

It will be appreciated that an OEO 30, 40, 50, 60, 80 according to any of the embodiments described above may alternatively be used.

Figure 15:
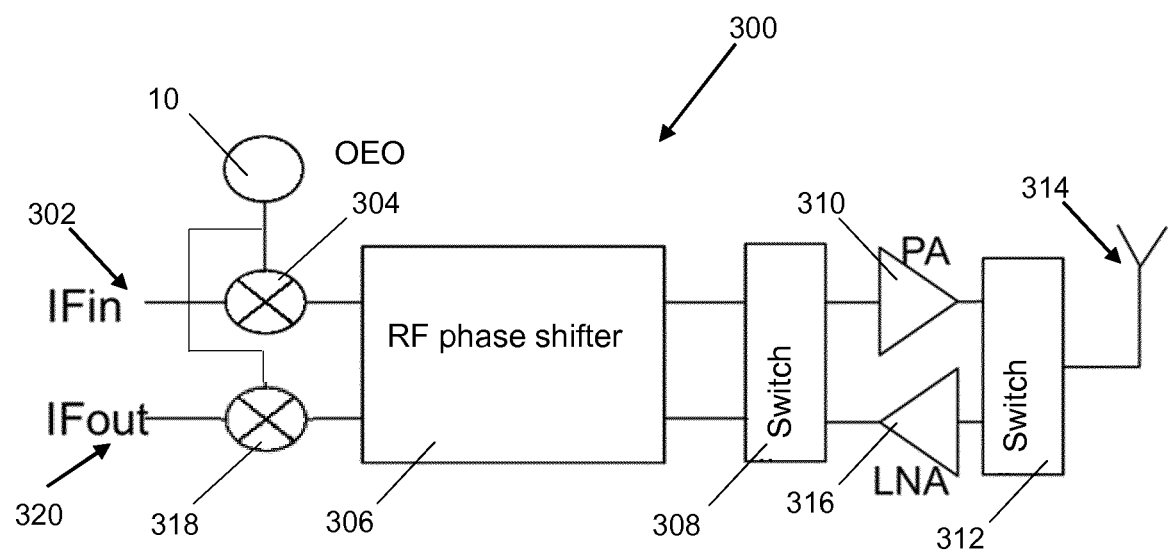
FIG. 15 is a schematic representation of an antenna element of a beamforming antenna according to an embodiment of the invention.

An embodiment of the invention provides a beamforming antenna 300, part of which is shown in FIG. 15. The beamforming antenna 300 comprises an OEO 10, as described above with reference to FIG. 1, an input 302, and output 320 and a plurality of radio frequency, RF, antennas 314.

The input 302 is arranged to receive a transmission signal having an intermediate frequency, IFin, for transmission on the electrical carrier signal output from the OEO 10. Each antenna 314 is configured to transmit the electrical carrier signal carrying the signal for transmission.

The beamforming antenna 300 additionally comprises a first mixing apparatus 304 for add the transmission signal, IFin, to the electrical carrier signal, to form an upconverted transmission signal, a plurality of RF phase shifters 306 each configured to apply a respective phase-shift to the upconverted transmission signal, switches 308, 312, and a power amplifier, PA, 310. The beamforming antenna 300 also comprises a low noise amplifier. LNA. 312, and a second mixing apparatus 318 for subtracting the electrical carrier signal from a received signal to form a downcoverted received signal at the intermediate frequency, IFout. The structure and operation of a beamforming antenna will be well known to the skilled person.

Figure 16:
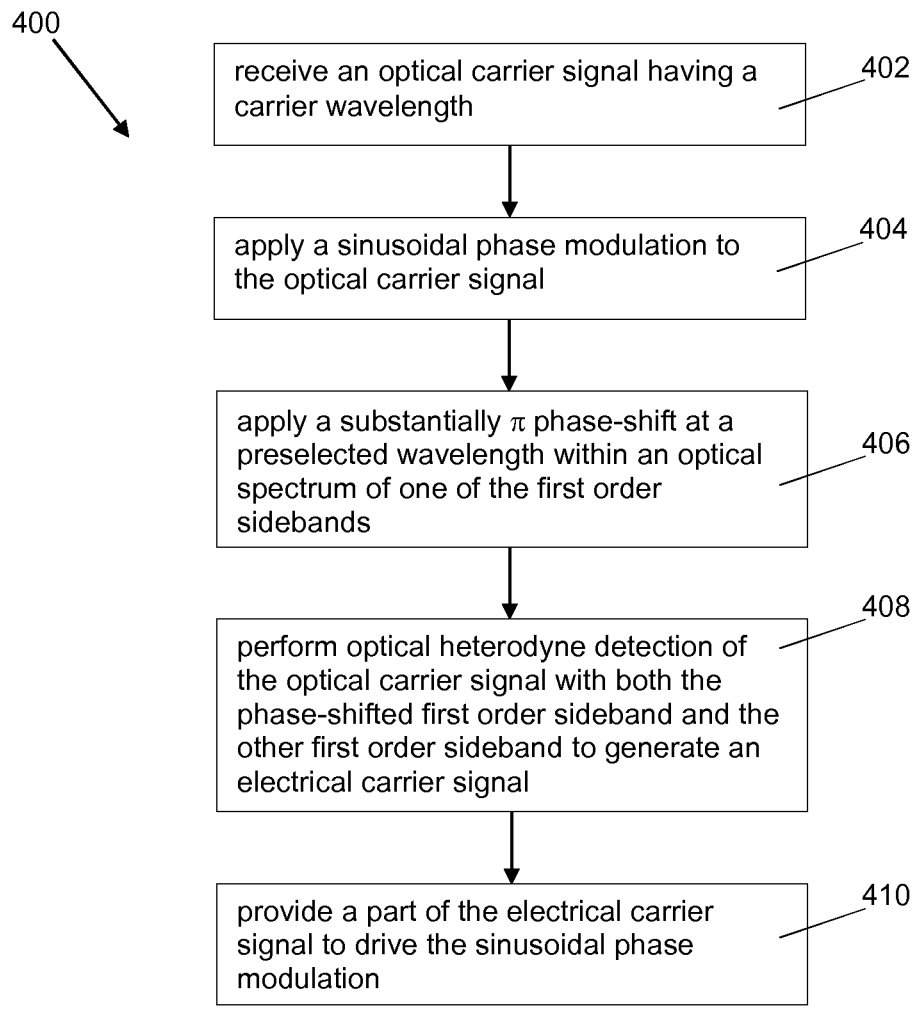
FIG. 16 shows the steps of a method according to an embodiment of the invention of generating an electrical carrier signal.

An embodiment of the invention provides a method 400 of generating an electrical carrier signal, having the steps illustrated in FIG. 16.

The method 400 comprises:

receiving 402 an optical carrier signal having a carrier wavelength;

applying 404 a sinusoidal phase modulation to the optical carrier signal to thereby generate two first order sidebands, located on either side of the optical carrier signal respectively, the two first order sidebands having a π phase difference between them;

applying 406 a substantially π phase-shift at a preselected wavelength within an optical spectrum of one of the first order sidebands;

performing optical heterodyne detection 408 of the optical carrier signal with both:

said one of the first order sidebands substantially π phase shifted by the optical resonator; and the other of the first order sidebands, to generate an electrical carrier signal having a frequency equal to a frequency difference between the carrier wavelength of the optical carrier signal and the preselected wavelength at which the substantially π phase-shift is applied; and providing 410 a part of the electrical carrier signal to drive the sinusoidal phase modulation.

In an embodiment, the method further comprises tuning the preselected wavelength within the optical spectrum of said one of the first order side bends at which the phase-shift is applied.

In an embodiment, the phase-shift is applied using an optical ring resonator.

In an embodiment, the method comprises tuning a resonant wavelength of the optical ring resonator within the optical spectrum of said one of the first order side bands.

In an embodiment, the phase-shift is applied using an optical ring resonator configured as an all-pass filter.

In an embodiment, the phase-shift is applied using an optical ring resonator configured as an add-drop filter.

In an embodiment, the method further comprises applying an additional phase shift to said one of the first order sidebands substantially π phase-shifted by the optical resonator.

In an embodiment, the method comprises applying the substantially π phase-shift at a preselected range of wavelengths within the optical spectrum of said one of the first order sidebands.

In an embodiment, the frequency of the electrical carrier signal is one of a radio-frequency, microwave and millimetre wave frequency.

In an embodiment, the sinusoidal phase modulation has a low modulation index.

Corresponding embodiments are also applicable to the method of transmitting a wireless communications signal and to the method of beamforming described below.

Figure 17:
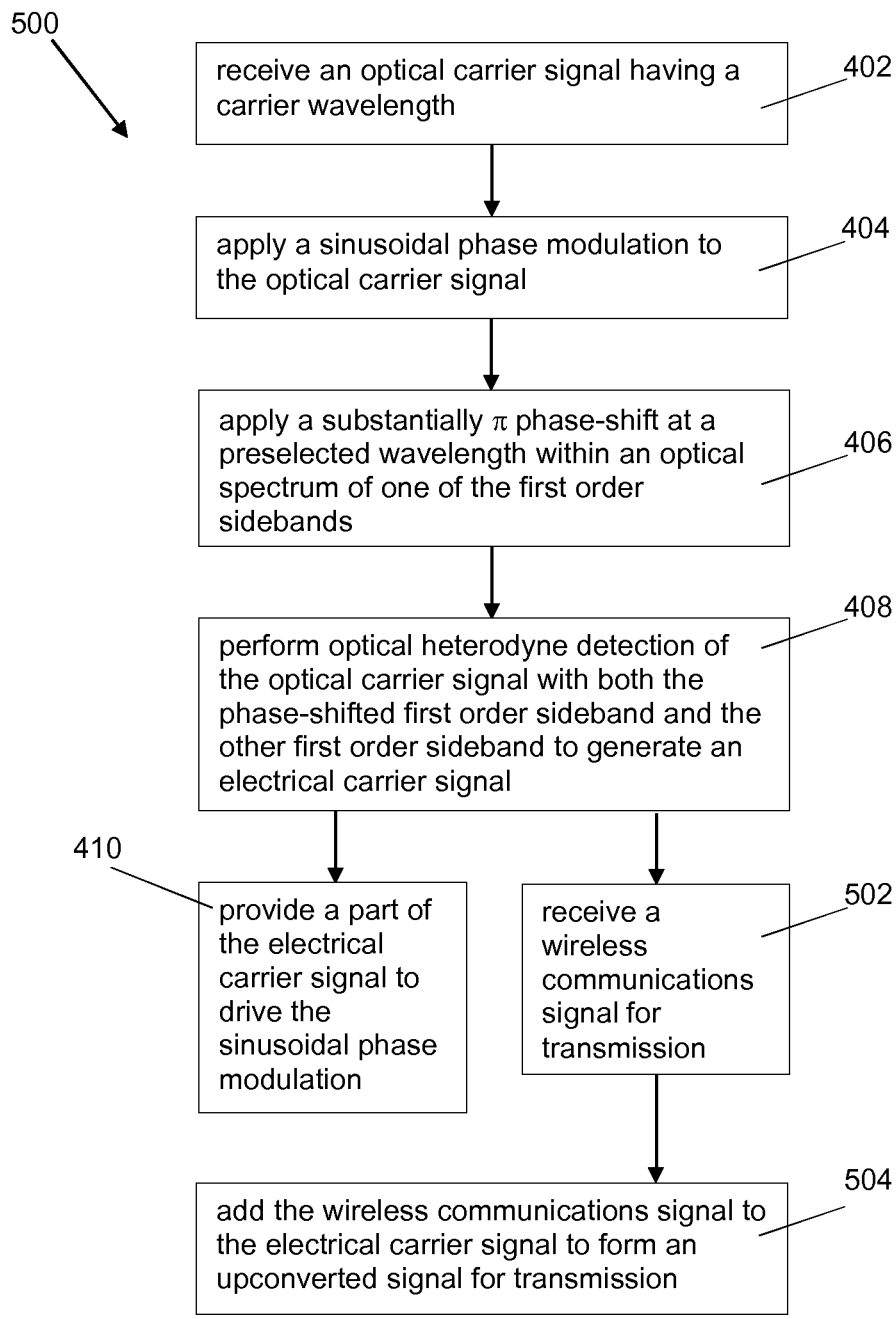
FIG. 17 shows the steps of a method according to an embodiment of the invention of transmitting a wireless communications signal.

A further embodiment of the invention provides a method 500 of transmitting a wireless communications signal, having the steps illustrated in FIG. 17.

The method 500 comprises:
receiving 402 an optical carrier signal having a carrier wavelength;
applying 404 a sinusoidal phase modulation to the optical carrier signal to thereby generate two first order sidebands, located on either side of the optical carrier signal respectively, the two first order sidebands having a π phase difference between them;
applying 406 a substantially π phase-shift at a preselected wavelength within an optical spectrum of one of the first order sidebands;
performing optical heterodyne detection 408 of the optical carrier signal with both: said one of the first order sidebands substantially π phase shifted by the optical resonator, and
the other of the first order sidebands,
to generate an electrical carrier signal having a frequency equal to a frequency difference between the carrier wavelength of the optical carrier signal and the preselected wavelength at which the substantially π phase-shift is applied;
providing 410 a part of the electrical carrier signal to drive the sinusoidal phase modulation;
receiving 502 a wireless communications signal for transmission; and
adding 504 the wireless communications signal to the electrical carrier signal to form
an upconverted wireless communications signal for transmission.

Figure 18:
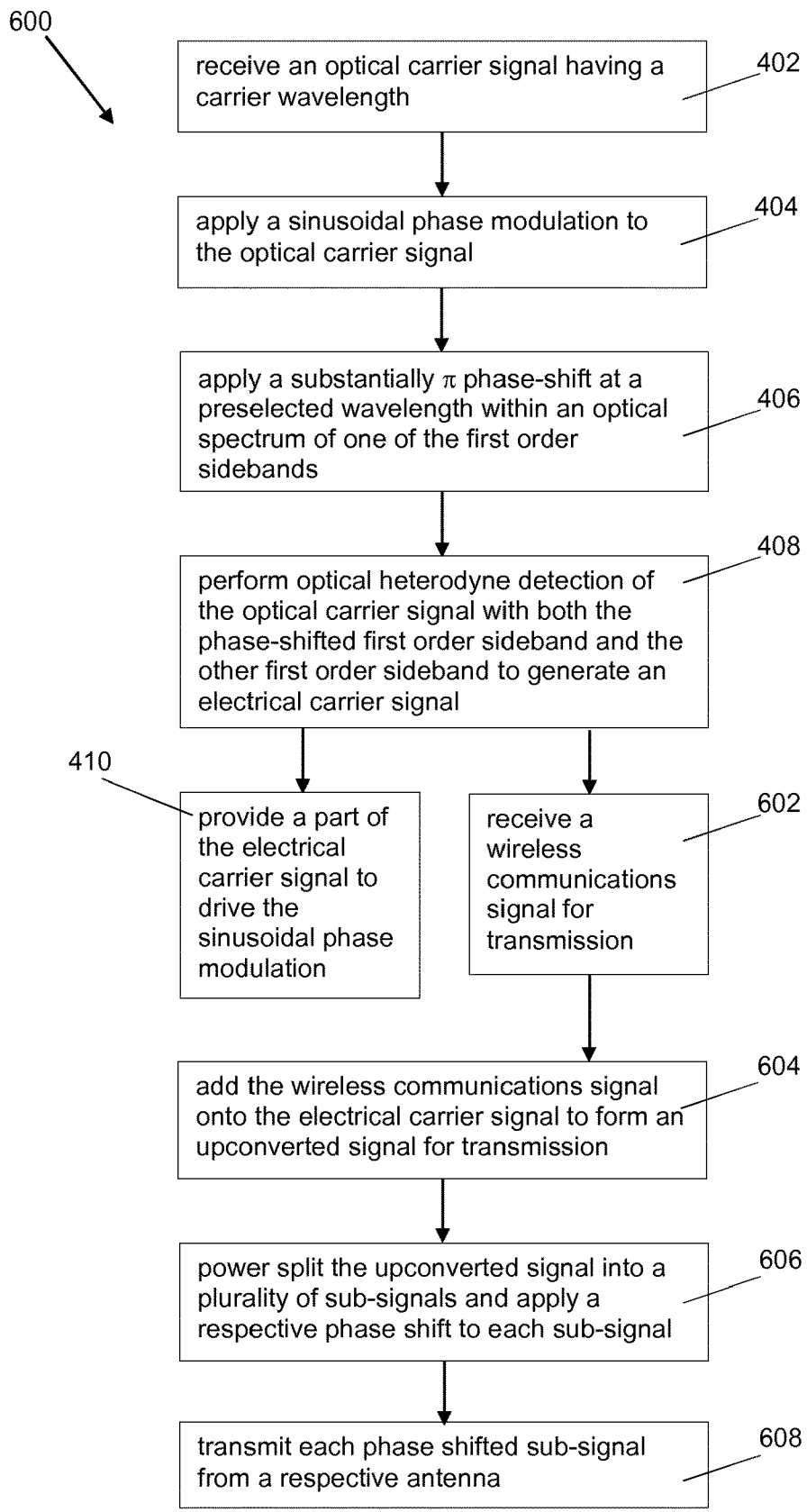
FIG. 18 shows the steps of a method according to an embodiment of the invention of beamforming and FIG. 19 shows the steps of a method according to an embodiment of the invention of receiving a wireless communications signal.

Another embodiment of the invention provides a method 600 of transmitting a wireless communications signal, having the steps illustrated in FIG. 18.

The method 600 comprises:
receiving 402 an optical carrier signal having a carrier wavelength;
applying 404 a sinusoidal phase modulation to the optical carrier signal to thereby generate two first order sidebands, located on either side of the optical carrier signal respectively, the two first order sidebands having a π phase difference between them;
applying 406 a substantially n phase-shift at a preselected wavelength within an optical spectrum of one of the first order sidebands;
performing optical heterodyne detection 408 of the optical carrier signal with both:
said one of the first order sidebands substantially π phase shifted by the optical resonator, and
the other of the first order sidebands,
to generate an electrical carrier signal having a frequency equal to a frequency difference between the carrier wavelength of the optical carrier signal and the preselected wavelength at which the substantially π phase-shift is applied;
providing 410 a part of the electrical carrier signal to drive the sinusoidal phase modulation;
receiving 602 a wireless communications signal for transmission;
adding 604 the wireless communications signal to the electrical carrier signal to form an upconverted wireless communications signal for transmission;
power splitting 606 the upconverted signal into a plurality of sub-signals and applying a respective phase shift to each sub-signal, and
transmitting 608 each phase shifted sub-signal from a respective antenna.

Figure 19:
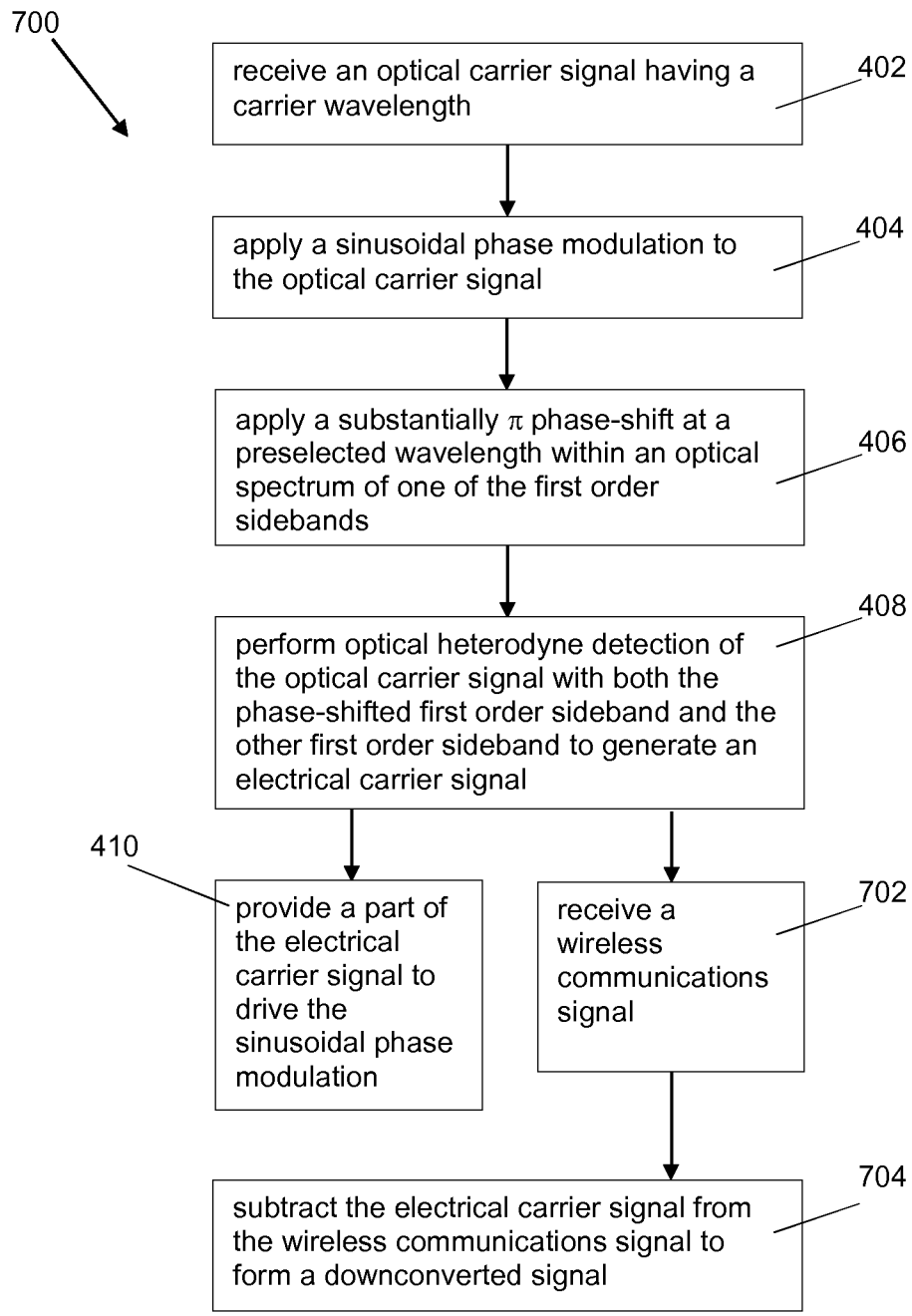

A further embodiment of the invention provides a method 700 of receiving a wireless communications signal, having the steps illustrated in FIG. 19.

The method 700 comprises:
receiving 402 an optical carrier signal having a carrier wavelength;
applying 404 a sinusoidal phase modulation to the optical carrier signal to thereby generate two first order sidebands, located on either side of the optical carrier signal respectively, the two first order sidebands having a π phase difference between them;
applying 406 a substantially π phase-shift at a preselected wavelength within an optical spectrum of one of the first order sidebands;
performing optical heterodyne detection 408 of the optical carrier signal with both:
said one of the first order sidebands substantially π phase shifted by the optical resonator; and
the other of the first order sidebands,
to generate an electrical carrier signal having a frequency equal to a frequency difference between the carrier wavelength of the optical carrier signal and the preselected wavelength at which the substantially π phase-shift is applied;
providing 410 a part of the electrical carrier signal to drive the sinusoidal phase modulation;
receiving 702 a wireless communications signal, and subtracting 704 the electrical carrier signal from the wireless communications signal to form a downconverted received wireless communications signal.

The invention claimed is:

1. An opto-electronic oscillator comprising:
an optical source configured to generate an optical carrier signal having a carrier wavelength;
an optical phase modulator configured to apply a sinusoidal phase modulation to the optical carrier signal to thereby generate two first order sidebands, located on either side of the optical carrier signal respectively, the two first order sidebands having a π phase difference between them;
an optical phase shifter comprising an optical resonator configured to apply a substantially π phase-shift to one of the first order sidebands at a preselected wavelength within an optical spectrum of said first order sideband; and
a photodetector configured to perform optical heterodyne detection of the optical carrier signal with both:
said one of the first order sidebands substantially π phase shifted by the optical resonator; and
the other of the first order sidebands,
to generate an electrical carrier signal having a frequency equal to a frequency difference between the carrier wavelength of the optical carrier signal and the preselected wavelength at which the optical resonator is configured to apply the substantially π phase-shift, and wherein a first part of the electrical carrier signal is delivered to an electrical output of the opto-electronic oscillator and a second part of the electrical carrier signal is delivered to the optical phase modulator as a drive signal for the optical phase modulator.

2. The opto-electronic oscillator as claimed in claim 1, wherein the optical resonator is configured such that the preselected wavelength at which the phase-shift is applied is tuneable within the optical spectrum of said one of the first order side bands.

3. The opto-electronic oscillator as claimed in claim 2, further comprising apparatus configured to tune the preselected wavelength of the optical resonator within the optical spectrum of said one of the first order side bands.

4. The opto-electronic oscillator as claimed in claim 1, wherein the optical resonator is an optical ring resonator.

5. The opto-electronic oscillator as claimed in claim 4, wherein the optical ring resonator is configured as an all-pass filter.

6. The opto-electronic oscillator as claimed in claim 4, wherein the optical ring resonator is configured as an add-drop filter comprising an input port to receive the optical carrier signal and the two first order sidebands from the phase modulator, a drop port to output said one of the first order sidebands following application of the substantially $\pi$ phase-shift and a throughput port to output the optical carrier signal, wavelengths other than the preselected wavelength within the optical spectrum of said one of the first order sidebands and the other first order sideband, and wherein the phase shifter comprises a first optical path from the throughput port to the photodetector and a second optical path coupling the drop port to the first optical path.

7. The opto-electronic oscillator as claimed in claim 6, wherein the optical phase shifter comprises a phase-controller within the second optical path, the phase-controller being configured to apply an additional phase shift to said one of the first order sidebands substantially $\pi$ phase-shifted by the optical resonator.

8. The opto-electronic oscillator as claimed in claim 1, wherein the optical phase modulator, the optical phase-shifter and the photodetector are implemented as a photonic integrated circuit.

9. A wireless communications transceiver comprising:
an opto-electronic oscillator as claimed in claim 1;
signal upconversion apparatus arranged to:
  receive a first part of the electrical carrier signal output from the opto-electronic oscillator;
  receive a transmission signal; and
  add the transmission signal to the first part of the electrical carrier signal to form an upconverted transmission signal;
and signal downconversion apparatus arranged to:
  receive a second part of the electrical carrier signal output from the opto-electronic oscillator;
  receive a received signal; and
  subtract the second part of the electrical carrier signal from the received signal to form a downconverted received signal.

10. A beamforming antenna comprising:
an opto-electronic oscillator as claimed in claim 1;
an input arranged to receive a signal for transmission on the electrical carrier signal output from the opto-electronic oscillator; and
a plurality of radio frequency antennas configured to transmit the electrical carrier signal carrying the signal for transmission.

11. An optical bandpass filter comprising:
an optical source configured to generate an optical carrier signal having a carrier wavelength;
an optical phase modulator configured to apply a sinusoidal phase modulation having a preselected frequency to the optical carrier signal to thereby generate two first order sidebands, located on either side of the optical carrier signal respectively, the two first order sidebands having a $\pi$ phase difference between them;
an optical phase shifter comprising an optical resonator configured to apply a substantially $\pi$ phase-shift at a preselected wavelength within an optical spectrum of one of the first order sidebands;
a photodetector configured to perform optical heterodyne detection of the optical carrier signal with both:
  said one of the first order sidebands $\pi$ phase-shifted by the optical resonator; and
  the other of the first order sidebands,
to generate an electrical output signal having a frequency equal to an frequency difference between the carrier wavelength of the optical carrier signal and the preselected wavelength at which the optical resonator is configured to apply the substantially $\pi$ phase-shift.

12. A method of generating an electrical carrier signal, the method comprising:
receiving an optical carrier signal having a carrier wavelength;
applying a sinusoidal phase modulation to the optical carrier signal to thereby generate two first order sidebands, located on either side of the optical carrier signal respectively, the two first order sidebands having a $\pi$ phase difference between them;
applying a substantially $\pi$ phase-shift to one of the first order sidebands at a preselected wavelength within an optical spectrum of said first order sideband;
performing optical heterodyne detection of the optical carrier signal with both:
  said one of the first order sidebands substantially $\pi$ phase shifted; and
  the other of the first order sidebands,
to generate an electrical carrier signal having a frequency equal to a frequency difference between the carrier wavelength of the optical carrier signal and the preselected wavelength at which the substantially $\pi$ phase-shift is applied; and
providing a part of the electrical carrier signal to drive the sinusoidal phase modulation.

13. The method as claimed in claim 12, further comprising tuning the preselected wavelength within the optical spectrum of said one of the first order side bands at which the phase-shift is applied.

14. The method as claimed in claim 12, wherein the phase-shift is applied using an optical ring resonator.

15. The method of transmitting a wireless communications signal, the method comprising:
generating an electrical carrier signal according to method of claim 12;
receiving a wireless communications signal for transmission; and
adding the wireless communications signal for transmission to the electrical carrier signal to form an unconverted wireless communications signal for transmission.

16. The method of receiving a wireless communications signal, the method comprising:
generating an electrical carrier signal according to method of claim 12;

receiving a wireless communications signal; and subtracting the electrical carrier signal from the wireless communications signal to form a downconverted wireless communications signal.

17. The method of beamforming comprising:

generating an electrical carrier signal according to method of claim 12;

receiving a wireless communications signal;

applying the wireless communications signal onto the electrical carrier signal to form a signal for transmission;

power splitting the signal for transmission into a plurality of sub-signals and applying a respective phase shift to each sub-signal; and transmitting each phase shifted sub-signal from a respective antenna.

* * * * *